US008169933B2

(12) United States Patent
Srinivasan et al.

(10) Patent No.: US 8,169,933 B2
(45) Date of Patent: May 1, 2012

(54) DYNAMIC TOPOLOGICAL ADAPTATION

(75) Inventors: Murari Srinivasan, Palo Alto, CA (US);
Amit Butala, Sunnyvale, CA (US);
Yashwanth Hemaraj, San Jose, CA (US)

(73) Assignee: Spidercloud Wireless, Inc., Santa Clara, CA (US)

( * ) Notice: Subject to any disclaimer, the term of this patent is extended or adjusted under 35 U.S.C. 154(b) by 267 days.

(21) Appl. No.: 12/571,211

(22) Filed: Sep. 30, 2009

(65) Prior Publication Data
US 2010/0085884 A1  Apr. 8, 2010

Related U.S. Application Data

(60) Provisional application No. 61/101,615, filed on Sep. 30, 2008, provisional application No. 61/101,630, filed on Sep. 30, 2008, provisional application No. 61/101,659, filed on Sep. 30, 2008, provisional application No. 61/101,652, filed on Sep. 30, 2008.

(51) Int. Cl.
*H04L 12/26* (2006.01)

(52) U.S. Cl. .................... 370/253; 370/331; 455/453

(58) Field of Classification Search ............ 370/252, 370/253, 331; 455/436, 445, 522, 452.1, 455/453, 450, 455, 509, 513, 514, 516, 446–448, 455/127.1, 517, 63.4, 456.1, 438, 443, 444, 455/405
See application file for complete search history.

(56) References Cited

U.S. PATENT DOCUMENTS

| 6,104,936 | A  | * | 8/2000  | Kronestedt ............... 455/562.1 |
| 7,139,274 | B2 |   | 11/2006 | Attar et al. |
| 7,162,250 | B2 |   | 1/2007  | Misra |
| 7,746,816 | B2 |   | 6/2010  | Attar et al. |
| 7,805,153 | B2 |   | 9/2010  | Hamabe |
| 7,991,403 | B2 | * | 8/2011  | Lee et al. ....................... 455/453 |
| 8,000,716 | B2 | * | 8/2011  | Tsao et al. .................... 455/453 |
| 8,014,781 | B2 |   | 9/2011  | Ji et al. |
| 2004/0229621 | A1 | | 11/2004 | Misra |
| 2007/0004423 | A1 | | 1/2007  | Gerlach et al. |
| 2007/0040704 | A1 | | 2/2007  | Smee et al. |
| 2007/0093261 | A1 | | 4/2007  | Hou et al. |
| 2009/0135790 | A1 | | 5/2009  | Yavuz et al. |
| 2009/0137241 | A1 | | 5/2009  | Yavuz et al. |
| 2009/0252099 | A1 | | 10/2009 | Black et al. |

FOREIGN PATENT DOCUMENTS

JP  03-022632  1/1991
WO  WO-2007/149616  12/2007

OTHER PUBLICATIONS

International Search Report for PCT Application No. PCT/US2009/059138 dated Mar. 3, 2010.

(Continued)

*Primary Examiner* — Gary Mui
(74) *Attorney, Agent, or Firm* — Foley & Lardner LLP

(57) ABSTRACT

Apparatus and methods for reconfiguration of a communication environment based on loading requirements. Network operations are monitored and analyzed to determine loading balance across the network or a portion thereof. Where warranted, the network is reconfigured to balance the load across multiple network entities. For example, in a cellular-type of network, traffic loads and throughput requirements are analyzed for the access points and their user equipment. Where loading imbalances occur, the cell coverage areas of one or more access points can be reconfigured to alleviate bottlenecks or improve balancing.

56 Claims, 15 Drawing Sheets

OTHER PUBLICATIONS

International Search Report for PCT Application No. PCT/US2009/059140 dated Jan. 29, 2010.

Qualcomm Europe: "Utran Enhancements for the support of inter-cell interference cancellation." 3GPP Draft; R3-080069 Utran Enhancements for the Support of Inter-cell Interference Cancellation, 3rd Generation Partnership Project (3GPP), Mobile competence Centre; 650, Route Des Lucioles; F-06921 Sophia-Antipoles Cedex; France, vol. RAN WG3, no. Sorrento, Italy; Feb. 11-15, 2008.

US Non-final Office Action for U.S. Appl. No. 12/571,216 mailed on Jan. 10, 2012.

* cited by examiner

DYNAMIC TOPOLOGICAL ADAPTATION

CROSS-REFERENCE TO RELATED APPLICATIONS

This application claims priority from Provisional Application(s) Ser. Nos. 61/101,615, 61/101,630, 61/101,659, and 61/101,652, all of which were filed on Sep. 30, 2008 and each of which is hereby incorporated herein by reference in their entirety.

TECHNICAL FIELD

The present invention relates generally to wireless communications, and more particularly, some embodiments relate to methods and apparatus to mitigate interference or the effects thereof in a wireless communication system.

DESCRIPTION OF THE RELATED ART

Perhaps the genesis of mobile telephones can be traced back to their predecessors: two-way radios that were regularly used in taxicabs, police cruisers, and other like vehicles. These early radios were of limited use and flexibility, and typically only provided half-duplex communications. More flexibility was introduced with the transportable telephones, also known as bag phones, which were used as mobile two-way radios, but could also be patched into the telephone network and used as portable phones.

The development of modern cellular technology is credited, in part to Bell Labs, whose engineers and scientists were responsible for such innovations as hexagonal cell transmissions for mobile phones and early developments in cellular telephony. However, Bell Labs was not alone. In 1973, Marty Cooper, the lead engineer of the team at Motorola that developed the handheld mobile phone, made what is believed to be the first public cellular telephone call. The call was placed to Dr. Joel S. Engel, head of research at AT&T's Bell Labs. This early work led to a paradigm shift from two-way radios and car phones to more personal, flexible and portable telephones, now known as mobile or cellular telephones.

Contemporary cellular communication systems utilize a series of base stations that relay communications from cellular telephones to other cellular phones and to the Public Switched Telephone Network (PSTN). The antenna towers for the base stations are geographically distributed in a manner so as to provide overlapping cell coverage to the subscriber mobile devices.

Accordingly, larger coverage areas may be split into multiple smaller cells to allow communications to be conducted at closer range and hence lower power, and to allow a larger number of users on a given network. Although coverage areas can vary, with macro cell networks, cell sites might have a range of up to approximately ½ mile in cities, while rural areas might have ranges approaching 5 miles or so. With femtocell networks, cellular ranges are often specified to be on the order of 10's of meters instead of miles.

As mobile devices move through coverage areas they are handed off from one base station to the next to provide mobile coverage. This handoff can be configured to switch the handset to a new cell site with a stronger signal and to a new radio frequency. When the handset responds through the new cell site, the exchange switches the connection to the new cell site. As such, in cellular telecommunications, the term handoff is used to refer to the process of transferring an ongoing call or data session from one channel connected to the core network to another.

In conventional networks, there may be different reasons why a handoff is conducted. For example, when a handset is moving away from one cellular coverage area toward another, the call is handed off to the next cell to provide continuity of service. Also, when a cell's capacity for calls is depleted, a call from a handset in an area overlapped by another cell may be transferred to that cell in order to relieve congestion in the first cell.

Accordingly, the parameters used as criteria for handoff determination are usually criteria relating to the received signal power, the received signal-to-noise ratio, a measured bit error rate and block error/erasure rate, and received quality of speech. In 2 G and 3 G CDMA systems, the most common criterion for handoff determinations is the Ec/Io ratio measured in the pilot channel (CPICH) (i.e., the ratio of received pilot energy, Ec, to total received energy or the total power spectral density, Io) or received signal code power (RSCP), which indicates the power measured by a receiver.

Conventionally, links in wireless systems are classified into two categories depending on the transmitting entity. The "downlink" refers to transmissions from an infrastructure element such as an access point or a base station to a handset or wireless terminal. The "uplink" refers to transmissions from the wireless terminal to the infrastructure element.

BRIEF SUMMARY OF EMBODIMENTS OF THE INVENTION

The present invention is directed toward a system and method for providing load or traffic based reconfiguration for communication networks. Network operations are monitored and analyzed to determine loading balance across the network or a portion thereof. Where warranted, the network is reconfigured to balance the load across multiple network entities. For example, in a cellular-type of network, traffic loads and throughput requirements are analyzed for the access points and their user equipment. Where loading imbalances occur, the cell coverage areas of one or more access points can be reconfigured to alleviate bottlenecks or improve balancing.

According to an embodiment of the invention in a communications network that is made up of a plurality of access points communicating with a plurality of wireless terminals, wherein a wireless terminal communicates with the network by way of an assigned access point, a method of load adjustment includes monitoring access point loading for a plurality of access points; evaluating access point loading across multiple access points to determine whether any loading imbalances exist in the network; and changing a coverage area of one or more access point to mitigate a determined loading imbalance. The method can further include handing off a wireless terminal from a first access point to a second access point as a result of the change in coverage area of either or both of the first and second access point; wherein the handoff can be forced or the handoff occurs automatically by normal network operation (e.g., a conventional handoff based on coverage) as a result of the change in coverage area. The method can be performed continuously, at a scheduled time, periodically or on an event-driven basis, and the steps of determining, evaluating and changing can be performed iteratively with gradual changes in coverage area.

In some embodiments, changing the coverage of an access point comprises decreasing a first coverage area of a first access point so as to at least partially exclude the wireless terminal from the first coverage area or changing the coverage of an access point comprises increasing a second coverage area of a second access point so as to at least partially include the wireless terminal in the second coverage area, or both.

The method of claim can further include a step of determining whether a change in coverage area is warranted before changing the coverage area in response to a determined loading imbalance. In some embodiments, determining whether a change in coverage area is warranted comprises comparing a loading of an access point to a threshold loading level for that access point or determining whether a change in coverage area is warranted comprises comparing a loading of an access point to a loading of another access point, or both.

In further embodiments, changing the coverage of an access point can include one or both of: adjusting a beam pattern of a first access point so as to at least partially exclude the wireless terminal from the first coverage area; and adjusting a beam pattern of a second access point so as to at least partially include the wireless terminal in the second coverage area. Beam pattern adjustment can be accomplished by steering the beam of an access point to arrive at a desired beam pattern.

In yet another embodiment, a control node for use in a communications network, can be provided to perform the operations described above. The control node can be implemented in hardware, software or a combination thereof, and can be located in an access controller or base station controller, at access points or base stations, or elsewhere in the network, or across a combination of these elements. The control node can include: a detection module configured to determine access point loading information; an evaluation module configured to evaluate access point loading across multiple access points to determine whether a loading imbalance exists in the network; a control module configured to control access point coverage areas and further configured to change the coverage area of an access point in response to changes in access point loads. The control module can be configured to change the coverage of one or more access points by signaling a first access point to increase the coverage area of first access point or signaling a second access point to decrease the coverage area of the second access point, the second access point being located adjacent said first access point or both. The control module can be configured to change the coverage of one or more access points by signaling a first access point to increase the coverage area of first access point and signaling a second access point to decrease the coverage area of the second access point, the second access point being located adjacent said first access point or both.

The control can further include a handoff module configured to hand off a wireless terminal from a first access point to a second access point as a result of a change in coverage area of either or both of the first or second access point. In some embodiments, changing the coverage of an access point comprises decreasing a first coverage area of a first access point so as to at least partially exclude the wireless terminal from the first coverage area, or increasing a second coverage area of a second access point so as to at least partially include the wireless terminal in the second coverage area. In another embodiment, changing the coverage of an access point comprises decreasing a first coverage area of a first access point so as to at least partially exclude the wireless terminal from the first coverage area, and increasing a second coverage area of a second access point so as to at least partially include the wireless terminal in the second coverage area. In yet another embodiment, the evaluation module is configured to evaluate loading to determine whether a change in coverage area is warranted before changing the coverage area in response to a determined loading imbalance.

The apparatus and methods described above can be implemented, at least in part, as computer executable instructions stored on a computer readable medium, which, when executed cause a control node to perform the methods described herein.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward a system and method for providing load-based or traffic-based reconfiguration for communication networks. In some embodiments, reconfiguration can be a dynamic reconfiguration allowing real-time or rapid response to changes in network loading. Network operations can be monitored and analyzed to determine loading balance across the network or a portion thereof. Where warranted, the network can be reconfigured to balance the load across multiple network entities. For example, in a cellular-type of network, traffic loads and throughput requirements are analyzed for the access points or base stations and their respective user equipment. Where loading imbalances occur, the cell coverage areas of one or more access points can be reconfigured to alleviate bottlenecks or improve balancing across some or all of the access points. In some embodiments, continuous, periodic or event-driven monitoring, analysis and reconfiguration occurs to allow the network to adapt to changing conditions. In addition to or in place of power control techniques to adjust cellular coverage areas, beam directing or beam steering techniques can be used to provide custom cell coverage areas.

Figure 1:
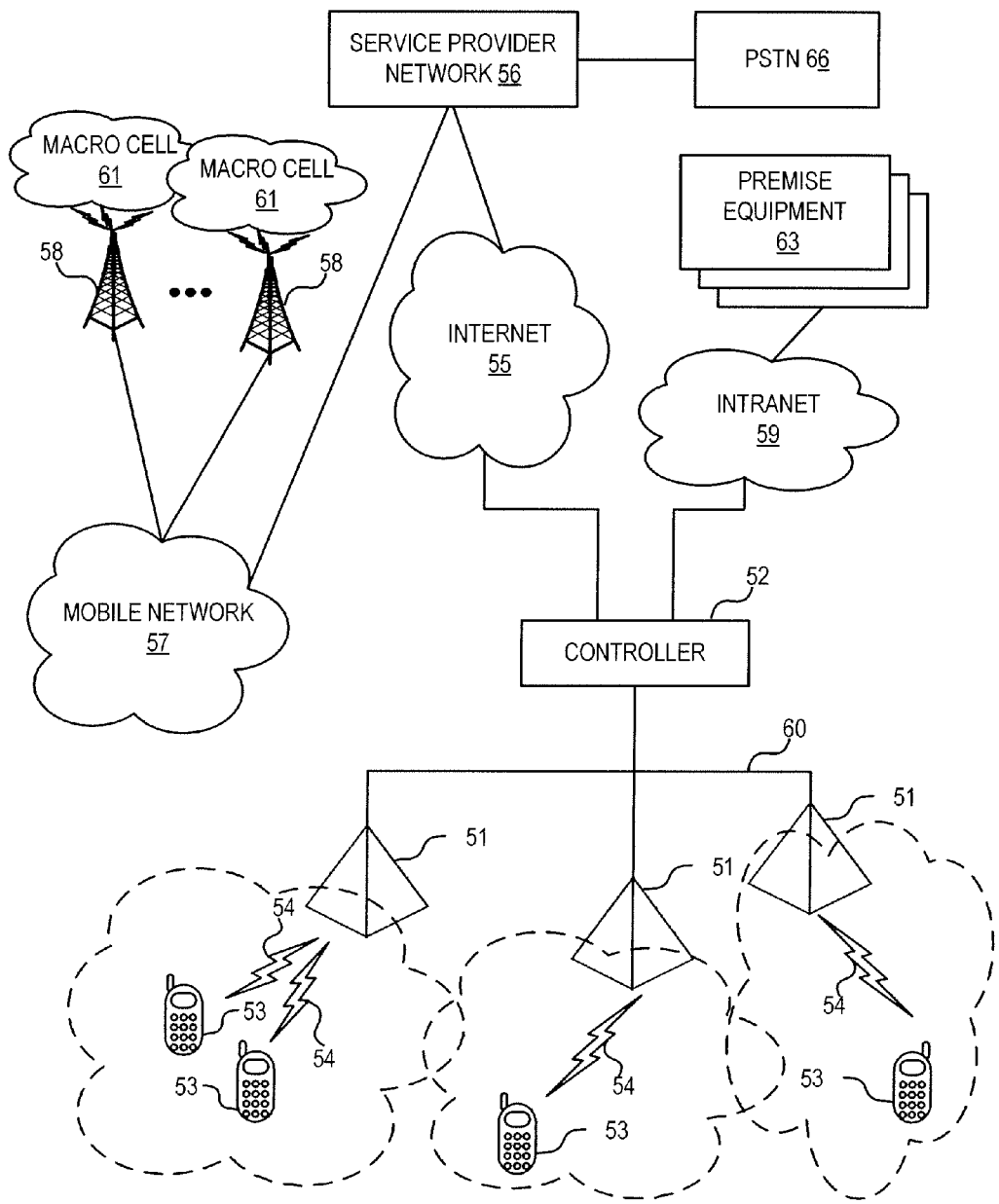
FIG. 1 is a drawing illustrating an example environment within which the methods and apparatus described herein can be implemented.

Before describing the invention in detail, it is useful to describe an example environment in which the invention can be implemented. One such example is that of a centrally-controlled femtocell system. FIG. 1 is a diagram illustrating a simplified architecture for such an example environment. In this example environment, one or more femtocells provide cellular coverage for wireless terminals. In some embodiments, wireless terminals can include handsets or other user equipment such as, for example cellular phones, smart phones, laptops, handheld communication devices, handheld computing devices, satellite radios, global positioning systems, PDAs, and/or any other suitable device for communicating over the wireless communication system.

In the illustrated example, femtocells 51 serve as base stations to provide cellular coverage over an air interface 54 to user equipment 53 within their respective areas of coverage. For example, femtocells 51 may be deployed at various locations within a building or other structure to provide cellular coverage to user equipment 53 within the building or structure. This can be advantageous, for example, in large buildings, underground facilities, within aircraft or other transportation vehicles, and within other structures and locations where conventional macro cell coverage is weak or insufficient. Femtocells can also be deployed in environments where it is desirable to augment the capacity of the conventional macrocellular network. Consider the case of a building with a plurality of femtocells distributed therein. In such an environment, the user equipment 53 registers with a femtocell 51 in its range within the building. As the user moves throughout the building, her cellular handset (or other terminal) may be handed off from one femtocell 51 to another to provide suitable coverage for her user equipment 53 as she moves within the building.

In various embodiments, user equipment 53 may comprise, for example, a cellular or mobile handset, a PDA having cellular system access, a laptop with cellular system access for data transmission over cellular systems, or other devices capable of accessing licensed spectrum communications networks for voice or data transmissions. In such applications, femtocells 51 are wireless access points configured to operate within the licensed spectrum to serve as base stations for the user equipment within their range. In other embodiments, femtocells 51 can be implemented as wireless access points for communications with compatible wireless terminals over proprietary or other non-licensed air interface. Although femtocells 51 are illustrated as exclusively wireless access points, embodiments can be implemented wherein femtocells 51 are implemented with wired interfaces to user equipment or a combination of wired and wireless interfaces.

As noted above, femtocell 51 operates as a base station and relays voice and data communication between the user equipment 53 and an end destination. For example, the end destination can be other user equipment within the building (for example, other wireless terminals 53, or other premise equipment 63), a cellular handset operating on a macro cell 61, the PSTN 66, Internet 55 accessible devices and so on.

In the illustrated environment, the femtocells 51 are centrally controlled by a controller 52, sometimes referred to as an access controller. Controller 52 may perform various functions, such as, for example, monitoring operations, coordinating communications among user equipment 53, relaying communications between user equipment 53 and other entities, licensed spectrum allocation, or load balancing amongst the femtocells 51. Femtocells 51 can be connected to access controller 52 via a backhaul 60 which can be implemented using a number of different communication topologies. The connections between the femtocells 51 and the access controller 52 could be dedicated, or the access points and controller could be coupled to one another via a switching network, such as a gigabit Ethernet network, for example.

Femtocells 51 are configured to provide cellular system access by transmitting voice and data transmissions to controller 52, which routes the communications via a packet switched network, such as the Internet 55, via an Intranet 59 or other communication path as appropriate. Accordingly, in some environments controller 52 may comprise a router or switch configured to allow the femtocells 51 to share a network connection and to access networks 55, 59. Controller 52 may also be configured to make routing determinations from among the various entities such that communications with a given wireless terminal 53 may be routed to at least one of the mobile network 57, other femtocells 51 other premise equipment 63 attached to the intranet 59, or other entities as may be accessible by controller 52.

In some examples, the system may further comprise a local intranet 56. For example, the controller 52 and femtocells 51 may be maintained by or integrated with an entity, such as a business or organization that also maintains its own local intranet 56. In some cases, users of the user equipment 53 may desire access to the intranet 56, such as for local data transfers or local voice calls. In such environments, the controller 52 may also mediate these communication activities.

The example environment further comprises a service provider network system 56. For example, the service provider network system may comprise a 2 G or 2.5 G network such as GSM, EDGE, IS-95, PDC, iDEN, IS-136, 3 G based network such as GSM EDGE, UMTS, CDMA2000, DECT, or WiMAX, or any other cellular or telecommunications or other network. Service provider network system 56 further comprises a cellular network 57, that can include mobile switching centers, base station controller and base stations 58 configured to provide macro cell coverage 61 in the environment.

Sometimes, the coverage area of macrocell 61 may overlap with that of femtocells 51, in such cases the controller 52 or the femtocells 51 may provide methods for mitigating interference between the elements. In some instances, user equipment 53 may move from areas covered by femtocells 51 to areas covered by macrocell 61. In these cases, the controller 52 may provide methods for handing off calls from the femtocells 51 to the macrocell 61. In other cases, the network system 56 or other network elements may mediate these transitions.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

For example, the innovations described herein often refer to access points and access controllers. As would be apparent to one of ordinary skill in the art after reading this description depending on the nature of the innovation, various embodiments may implement these components as components of a femtocell network (such as the femtocells 51 and access controller 52 described with reference to FIG. 1), or as other access point and controller elements (e.g., base stations and base station controllers) in macro cells, other radio area networks, or other like topologies. Additionally, in peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified. Accordingly, access point and access controller functions can, in some embodiments, be distributed amongst peers, delegated to super peers, or shared amongst peers and super peers.

For instance, in 3GPP HSUPA systems (UMTS Release 6), the infrastructure element access point or base station is referred to as a "NodeB." The serving NodeB is responsible for allocating a maximum transmit power resource to a wireless terminal (referred to as user equipment, user element or UE in UMTS specifications). In 3GPP LTE (Long Term Evolution) and like systems, uplink power control utilizes a closed-loop scheme around an open-loop point of operation. The uplink performance of the network is decisively influenced by power control. In 802.16 WiMAX systems, the serving base station is responsible for allocating an OFDMA resource element as well as potentially a maximum transmit power resource to the wireless terminal (called Subscriber Station or SS in the WiMAX specifications). Although many of the examples provided herein are described in terms of a UMTS application, after reading this description one of ordinary skill in the art will understand how these techniques can be implemented in alternative environments.

Although the environments described above can be characterized as a femtocell, macro cellular network or other like topological structure, the methods and apparatus described herein are also well suited to other scenarios, environments and applications, such as a wireless network or a system deployment that has no access controller but comprises distributed wireless access points, which can communicate in a peer-to-peer manner. The innovations described herein are not constrained by the actual choice of wireless protocol technology or network topology, but may be implemented across a wide range of applications as will be appreciated by one of ordinary skill in the art after reading this description.

The innovations described herein are applicable to licensed-spectrum-based cellular technologies in which infrastructure elements such as base stations or access points are provided as entities in the system with some level of coordination. In addition, the innovations are also applicable to unlicensed-spectrum with or without coordinating entities, including, for example, technologies such as WiFi and other technologies that employ peer-to-peer communication techniques.

In hierarchical systems, various functions described herein can be centralized in a control node such as a base station controller or access controller; distributed among like nodes such as base stations or access points; or distributed throughout the hierarchy in base stations and base station controllers. Also, the functions can be included in wireless terminals as well. However, a preferred embodiment relies on base stations or base station controllers to exchange information and instructions and can use wireless terminals in the manner designed for existing networks so as to avoid the need to update or modify existing wireless terminals or run a thin client on the terminals. For example, as certain of the below-described embodiments illustrate, the access points can be configured to instruct the wireless terminals to transmit known signals (such as pilot signals, for example); and can use existing control mechanism such as uplink power control. The systems can also be configured to take measurements of wireless terminal operations to make decisions to avoid, reduce or minimize interference. Other embodiments may place some of these control mechanisms on the wireless terminals or make other distribution of functionality than those examples described herein.

In peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified.

Various innovations are described in this document in the context of an exemplary embodiment of the system, such as the example environment described above with reference to FIG. 1, which comprises multiple wireless access points, coupled to an access controller. The connections between the access points and the controller could be dedicated, or the access points and the controller could be coupled to one another via a switching network, such as a gigabit Ethernet network, for example. It should be noted that the innovations are also applicable to wireless system architectures that differ from the example environment and exemplary embodiments described herein, such as a completely distributed system that involves access points that can communicate between themselves in a peer-to-peer manner.

Figure 2:
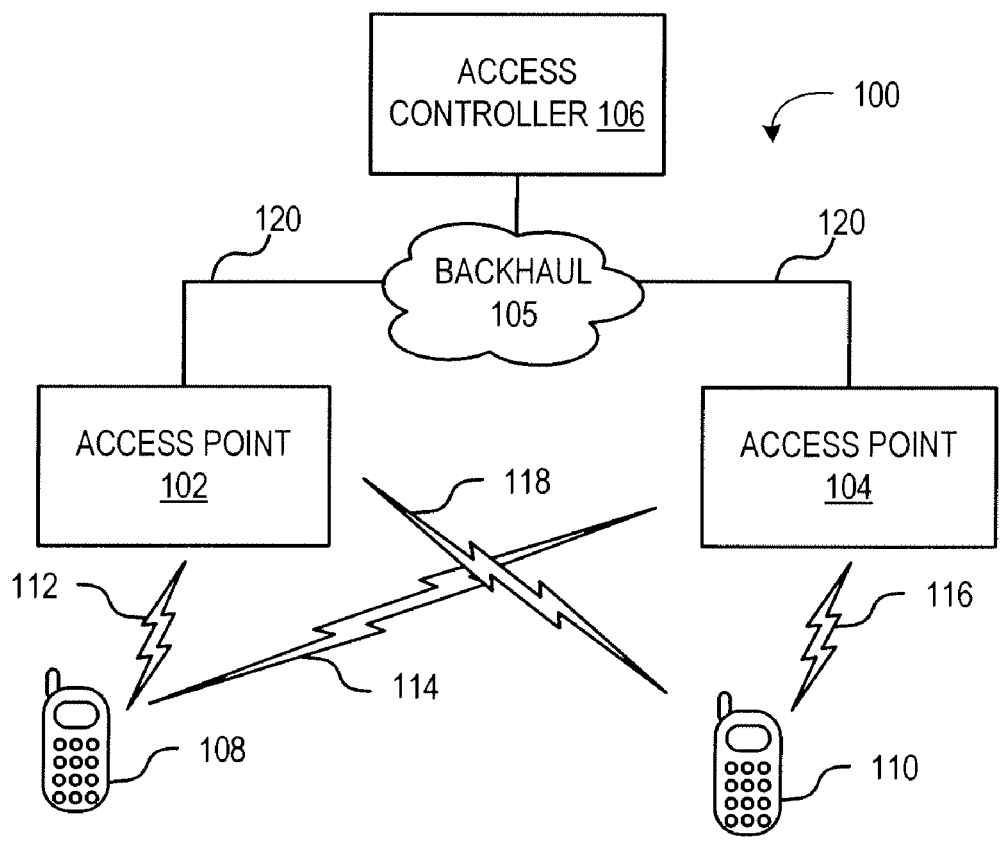
FIG. 2 is a drawing illustrating exemplary path losses between access points and wireless terminals.

FIG. 2 is a diagram illustrating an example system architecture in accordance with one embodiment of the invention. Referring now to FIG. 2, this example architecture 100 includes an access controller 106, a plurality of wireless access points 102, 104, and a plurality of wireless terminals 108, 110. Although there can be more than two wireless terminals 108 and more than two access points 102, 104 communicating with an access controller 108, only two of each are illustrated for simplicity and ease of description. In this simple example, access points 102, 104 are linked to access controller 106 via a backhaul network 105, which can be implemented using a number of different network topologies including, for example, a gigabit Ethernet network. As would be apparent to one of ordinary skill in the art after reading this description, other forms of backhaul 105 connection can also be provided. Access controller 106 in various embodiments, can be configured to control access points 102, 104, as well as share information among access points 102, 104.

Although illustrated as a separate box in example architecture 100, in another embodiment, the functionality of access controller 106 can be embedded in one or both access points 102, 104. Accordingly, rather than communicate with access controller 106 via communication paths 120, access points 102, 104 may communicate with each other directly or indirectly via a separate communication path in environments where information is shared between access points 102, 104.

In considering the uplink scenario, each wireless terminal 108, 110 is assumed to be primarily controlled by a respective serving access point 102, 104. In this document, a wireless terminal is sometimes referred to as being registered with its serving or controlling access point. However, depending on the proximity of access points 102, 104 and the locations of wireless terminals 108, 110, signals from either of the wireless terminals 108, 110 may interfere with their respective non-controlling access point 102, 104. To elaborate, consider the example in which it is assumed that wireless terminal 108 is registered with or controlled by access point 102, and wireless terminal 110 is registered with or controlled by access point 104. Accordingly, uplink transmissions 112 from wireless terminal 108 are intended to be routed through access point 102, while uplink transitions 116 from wireless terminal 110 are intended to be routed through access point 104. Accordingly, in the illustrated example it is shown that transmissions by wireless terminal 108 may cause interference 114 with access point 104, and transmissions by wireless terminal 110 may cause interference 118 with access point 102.

Figure 3:
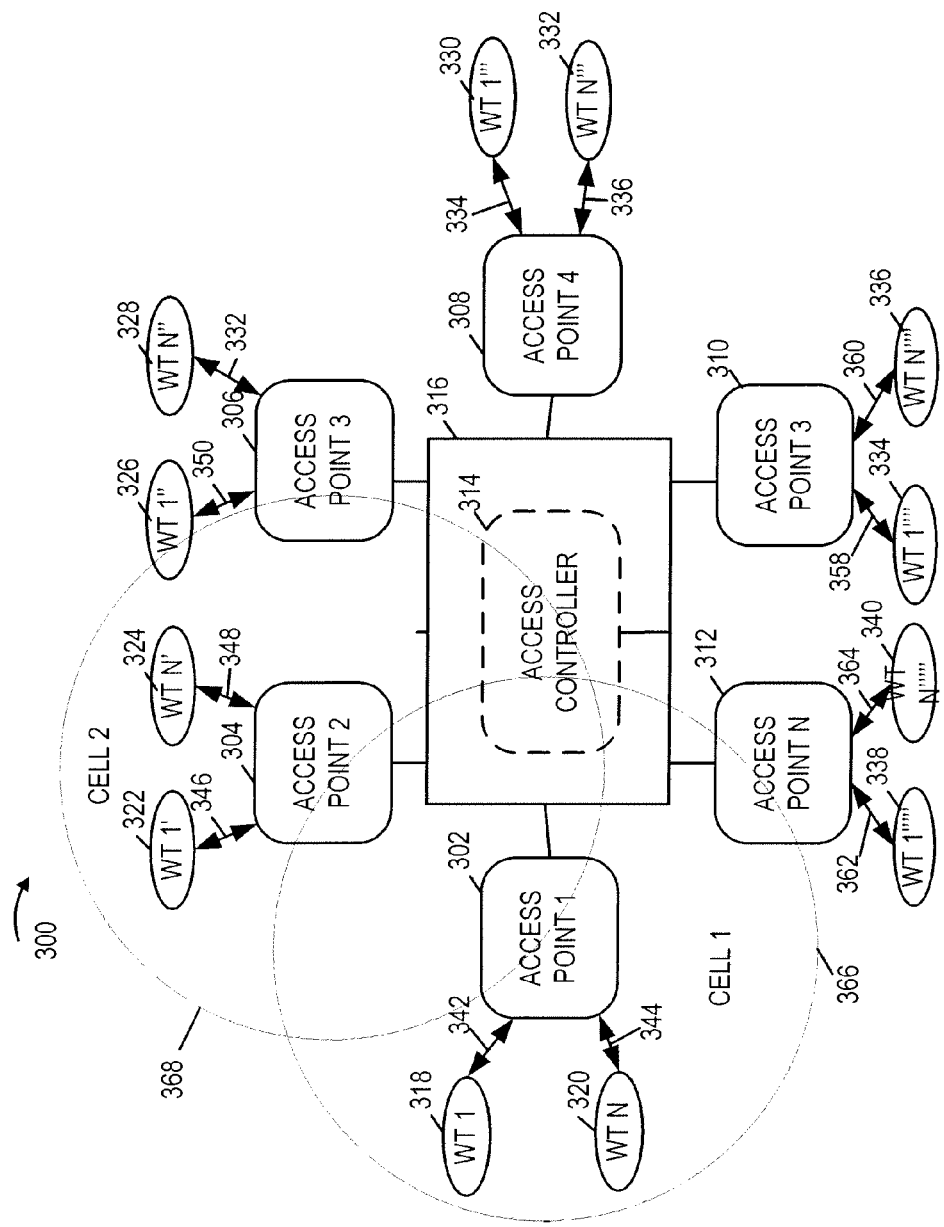
FIG. 3 is a diagram illustrating an example communication system in accordance with one embodiment of the invention.

FIG. 3 is a diagram illustrating an example communication system in accordance with one embodiment of the invention. The example illustrated in FIG. 3 depicts a cellular type of architecture, such as a femtocell or other cellular architecture, that includes a single access controller 314 that can be used to control and communicate with a plurality of access points 302, 304, 306, 308, 310 and 312. In this example, the access points 302, 304, 306, 308, 310, 312 are all wireless access points that communicate with a plurality of wireless terminals such as handsets, for example, or other wireless devices. Accordingly, the access points can each define a communication cell, an example of which can include a femtocell. To avoid excessive clutter in the drawings, only two cells 366, 368 are illustrated. Cell 1 366 illustrates an example coverage area for access point 302 and cell 2 368 illustrates an example coverage area for access point 304. As will be appreciated by one of ordinary skill in the art after reading this description, the other access points will also have corresponding areas of cell coverage.

The access points 302, 304, 306, 308, 310, 312 are communicatively coupled to access controller 314 by way of a backhaul 316. For example, in various embodiments, backhaul 316 can be implemented utilizing a communication network such as a packet-switched network. Likewise, alternative communication schemes or topologies can be implemented for backhaul 316. In some embodiments, access controller 314 is configured to coordinate or control at least some of the operations of at least some of the access points 302, 304, 306, 308, 310, 312. Likewise, access controller 314 can serve as a base station to relay communications among the access points 302, 304, 306, 308, 310, 312 (and ultimately their respective wireless terminals), as well as between the access points 302, 304, 306, 308, 310, 312 and their respective wireless terminals and other entities.

The access points 302, 304, 306, 308, 310, 312 are configured to communicate with wireless devices 318 . . . 340 within their respective cells. Such communications can comprise voice and data communications. Examples of wireless devices can include a cellular phone or other wireless terminal. Accordingly, at least some of the wireless terminals can be mobile devices that may move into and out of communication system 300 as well as within communication system 300. In FIG. 3, wireless terminals 318 . . . 320 are coupled to access point 302 via wireless links 342 . . . 344. Likewise, wireless terminals 322 . . . 324 are coupled to access point 304 via wireless links 346 . . . 348, and so on for the other access points 306, 308, 310, 312 as depicted in this example. In some embodiments, the geographical locations of the access points are known to the controller as well as to the access points.

FIG. 3 generally depicts a cellular architecture in which a plurality of cells or access points are distributed to provide coverage cells to the multiple wireless terminals in the coverage areas. The access points are under control and coordination of the access controller. Accordingly, FIG. 3 can represent a number of different communication architectures such as a femtocell architecture and a macro cell architecture. The various embodiments discussed below are described in terms of the components and topology illustrated in FIG. 3. However, after reading these descriptions, it will be apparent to one of ordinary skill in the art how these embodiments can be implemented with other architectures.

Figure 4A:
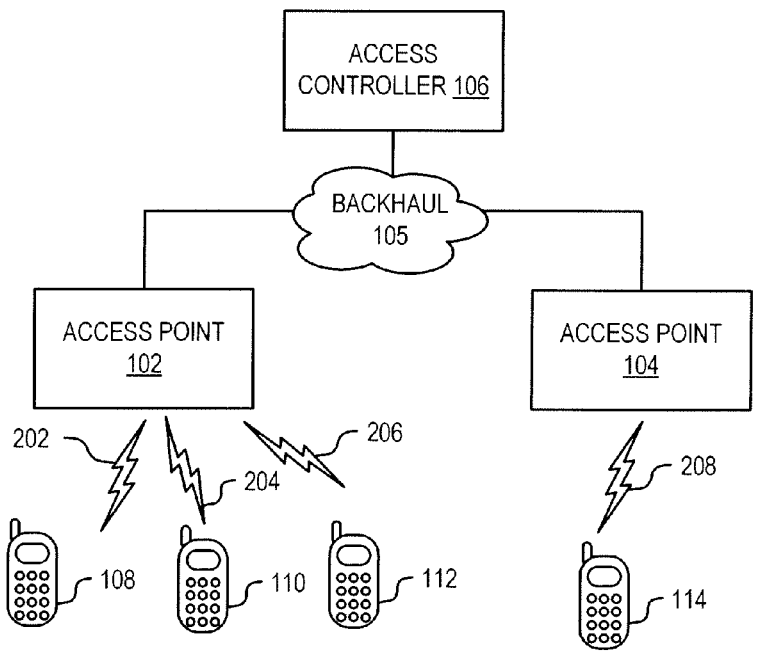
FIG. 4A is a diagram illustrating one example scenario for imbalanced loading in a simplified wireless network.

FIG. 4A is a diagram illustrating one example scenario for imbalanced loading in a simplified wireless network. The example illustrated in FIG. 4A comprises a network of the same fundamental configuration as that shown in FIG. 2, but with two additional handsets. This example includes an access controller 106 controlling two access points 102, 104 via a backhaul 105 through which communications are exchanged. In this example, it can be seen that three wireless terminals 108, 110, 112 are accessing the network using access point 102 via communication links 202, 204, 206, and one wireless terminal 114 is accessing the network through access point 104 via wireless communication link 208. In operational scenarios where the traffic load to and from each of the wireless terminals 108, 110, 112, 114 is somewhat equal, access point 102 is handling approximately 3 times as much traffic as access point 104. Accordingly, the example illustrated in FIG. 4A exhibits a scenario for uneven loading in these circumstances. As such, the end-user throughputs experienced by users served by access point 102 may more likely be lower than the end-user throughputs experienced by the user at access point 104. In a scenario where the traffic load on wireless terminal 114 is relatively light as compared to the traffic loads on wireless terminals 108, 110 112, the loading as between access points 102 and 104 can be even more imbalanced.

Figure 4B:
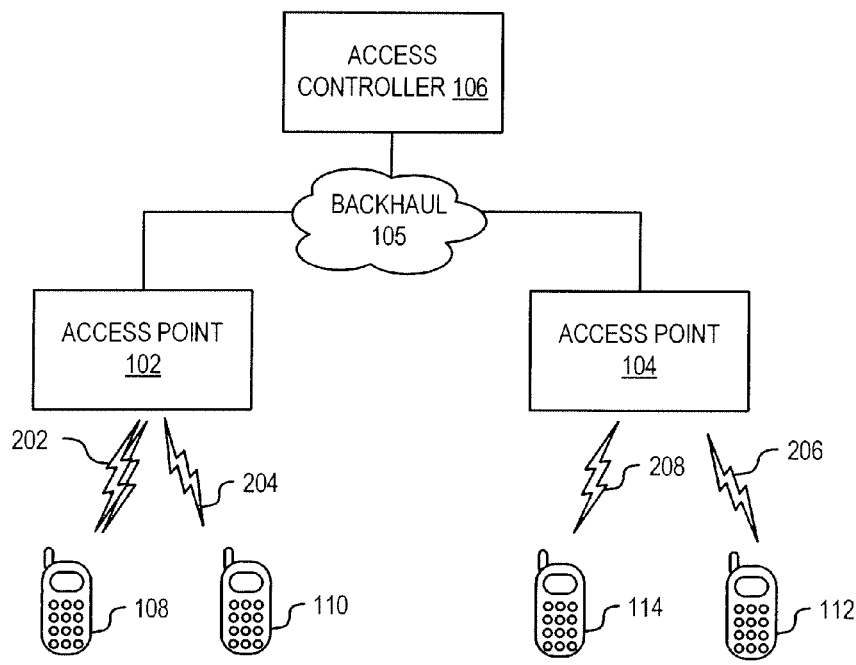
FIG. 4B is a diagram illustrating another possible scenario of imbalanced loading between access points.

FIG. 4B is a diagram illustrating another possible scenario of imbalanced loading between access points. Referring now to FIG. 4B, this diagram illustrates the same basic simplified network configuration as that depicted and described above with reference to FIG. 4A but with a different terminal assignment. In the example of FIG. 4B, the loading of the access points may appear balanced as each access point 102, 104 is serving an equal number of wireless terminals. Particularly, two wireless terminals 108, 110 access the network via access point 102 over wireless links 202, 204, respectively. Likewise, two wireless terminals 114, 112 access the network via access point 104 over wireless links 208, 206, respectively. However, in a scenario where one of the wireless terminals has higher throughput requirements than the others, the access point serving that wireless terminal will typically have a higher traffic load in the other access point, resulting in an imbalance in the network. For example, consider a scenario in which wireless terminal 108 is a preferred user that has higher throughput requirements than other wireless terminals 110, 112, 114, which are standard class users. In such a scenario, it is likely that access point 102 would experience higher loading levels than access point 104. It is also possible that wireless terminal 110 may suffer from reduced available throughput as compared to that available by wireless terminals 112 and 114.

In such a scenario, one option might be to handoff wireless terminal 110 from access point 102 to access point 104. Such a handoff would place wireless terminal 110 with the other more lightly loaded set of users, potentially increasing its end-user throughput. However, load balancing by making a handoff alone without paying proper attention to the RF signal interference considerations may lead to other issues. For example, where normal network configuration or handoff operations have led to the assignment of wireless terminal 110 to access point 102, it is likely that access point 102 is the best serving cell for wireless terminal 110 from an RF perspective. Accordingly, there can be negative consequences that arise from associating wireless terminal 110 with access point 104. For example, the downlink signal strength from access point 104 to wireless terminal 110 will likely be lower than the downlink signal strength from access point 102 and wireless terminal 110. The resulting reduction in signal-to-noise ratio experienced by wireless terminal 110 may likely take away some of the gains achieved by reallocating wireless terminal 110 to the more lightly loaded cell 104. Likewise, on the uplink, the transmission from wireless terminal 110 to access point 104 would likely cause a higher level of interference to access point 102. This can be compounded by the higher path loss between wireless terminal 110 and access point 104, which may require a higher uplink transmit power for wireless terminal 110. Accordingly, forcing a handoff of a wireless terminal based on load balancing considerations can have negative effects on the network. However, load balancing through a dynamic allocation or reallocation of wireless terminal and access point assignments can be beneficial to the overall network performance if properly performed.

Figure 5:
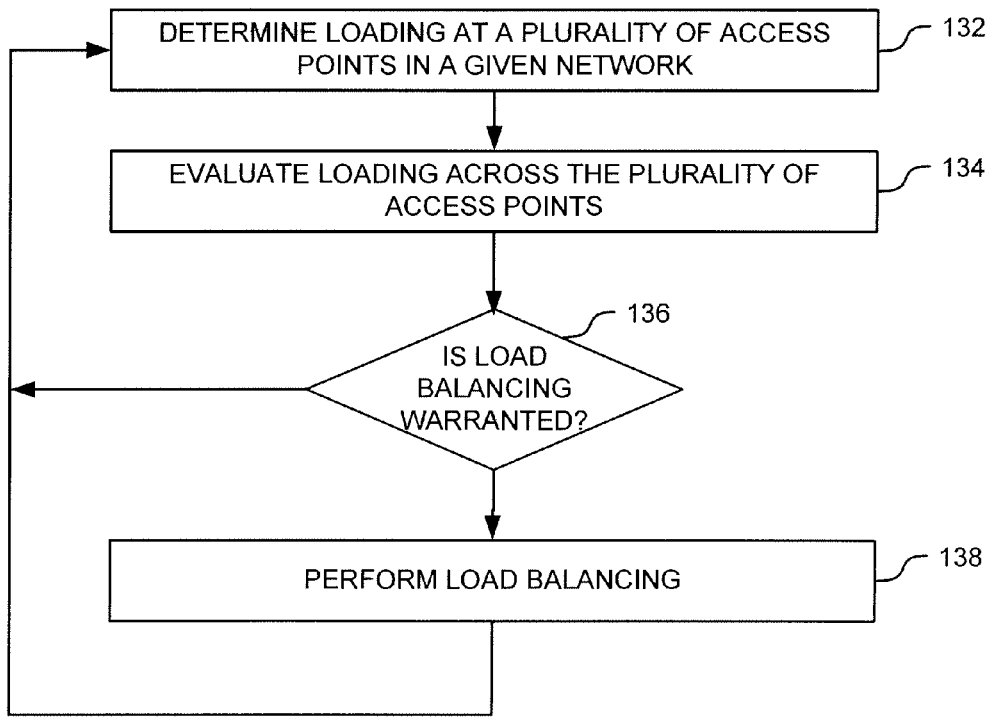
FIG. 5 is an operational flow diagram illustrating an example process for load balancing in accordance with one embodiment of the invention.

FIG. 5 is an operational flow diagram illustrating an example process for load balancing in accordance with one embodiment of the invention. Referring now to FIG. 5, the loading of a plurality of access points in the network is determined and evaluated. This is illustrated by steps 132 and 134. This loading determination can be made by determining not only the number of wireless terminals registered to each access point, but also by looking at the class or type of user for each wireless terminal and the data throughput requirements for each wireless terminal. Accordingly, the system examine factors such as the traffic load that each access point is experiencing on average and peak basis as well as the throughput available or allocated to each of the wireless terminals. These factors can be considered for each access point and wireless terminal individually, as well as for these system components relative to other components such as their peers. For example, loading amongst a group of access points can be compared to evaluate the relative loadings within the group. This determination and evaluation can be made by the access points and the access controller. For example, in one embodiment the access points can be responsible for collecting information regarding registered terminals, throughput rates and requirements, and for reporting this information back to the access controller to evaluate and determine actual load balancing. In another embodiment, determination evaluation can be shared amongst the access points themselves, which can report to each other either directly or via an access controller. Likewise, any peer-to-peer network, evaluation and determination can be made amongst the peer network devices.

At step 136, the system determines whether load balancing is warranted based on the results of the evaluation performed at step 134. For example, if the current loading across a plurality of access points is uneven to the extent that a given access point is operating above a determined threshold requirement or simply above capacity, load balancing may be warranted. As a further example, if a given access point is operating at greater than 85% of its total throughput capacity, the system may determine that load balancing is appropriate. In other embodiments, other threshold levels can be established. In another embodiment, the system may look at relative capacities and headroom across all or part of the entire network, in addition to individual access point capacities and headrooms.

In addition, the system not only looks at capacities, throughput, and current loading levels at the access points but also evaluates the likely results of a load balancing operation or of multiple different load reallocation scenarios. In other words, even in a scenario where the access points are imbalanced with respect to one another, load balancing may not be warranted where reassignment or reallocation of one or more wireless terminals would not yield improvement in overall network performance. As a particular example, where reallocating a high-priority, high-throughput user would do nothing more than transfer the loading problem from one access point to another access point, or cause a different loading problem, the reallocation operation may not be warranted. Indeed, not only is it possible that reallocation in this scenario may simply shift the loading problem, it may also create other problems with respect to the RF links between the shifted terminals and the access points.

Additionally, the system may determine that detriments caused by reallocation outweigh the benefit of the reallocation. For example, where capacity issues are only at peak periods, the system may determine that it is better for overall network performance to tolerate brief periods of bandwidth bottlenecks, than to reconfigure the network and perhaps suffer RF performance degradation. For example, interference due to increased power levels of one access point relative to another, less-than-ideal cell pattern coverage, or other downsides may outweigh the benefits of avoiding peak-time, short-duration bottlenecks.

Furthermore, where the system is considering the current state of the network with multiple terminals and the effects on those terminals in a changed configuration, the system may also consider classes of devices or data. For example, certain classes of device or data may warrant a higher priority treatment than other classes. Accordingly, wireless terminals can be weighted and higher priority terminals or terminals handling higher priority traffic can be weighted more heavily in the decision-making process regarding reallocation. For example, if a terminal is experiencing throughput problems but is a relatively low-priority terminal, the reallocation algorithm may determine that changes in the network configuration are not warranted to attempt to provide more bandwidth to a low-priority terminal more low-priority date.

Still further, in other embodiments, the system may consider the relative coverage of the various cell sites in making a determination as to whether a reconfiguration is warranted. For example, if the reconfiguration would result in returning the network to a baseline configuration of cell coverage areas, the controller may be biased in favor of performing the reconfiguration. Additionally, upper and lower bounds on cell areas can be established beyond which the reconfiguration will not be allowed to take place. For example, practical limits on access point transmit power levels, attenuation levels, quality of service requirements, path losses, EMI restrictions and other criteria may dictate upper and lower bounds on cell areas.

At step 138, if load balancing is warranted as determined in step 136, a load balancing is performed. For example, the allocations of wireless terminals to the access points can be re-arranged to balance the loads across the access points. The load balancing may, in some instances involve a handoff of a wireless terminal from one access point to another. However, as described above forcing a handoff for load balancing purposes can lead to deleterious affects the network. Therefore, in some embodiments, characteristics of the access points are changed to effectuate the reallocation. For example, in one embodiment the cell coverage area of the affected access point or coverage areas of multiple points can be adjusted. Such adjustment can causing normal network operations to handoff the identified terminal from the overloaded access point to a more lightly loaded access points.

Also, such an adjustment may not result in a normal handoff and a handoff can be forced. Furthermore, the handoff may be either a soft handoff or a hard handoff in various embodiments. The system may use conventional criteria for determining whether a soft handoff or a hard handoff should occur. Additional, in some embodiments the system can evaluate the loading as among the voice and data channels when performing the load balancing evaluation and can cause the handoff to be a soft or hard handoff based on relative loading. Therefore, adjustment of a coverage area can be done so that a wireless terminal is either completely excluded from a prior cell such that no communications are possible or practical given the path loss, or partially excluded so that path losses are sufficient so as to not create interference issues with the prior cell. Likewise, for adjustment of the coverage area of the cell that is picking up the terminal, the adjustment can be done so that a wireless terminal is either completely excluded from a prior cell. Adjustment for partial exclusion or inclusion can be useful in situations where a soft handoff is to take place; such as, for example, where a handset will maintain contact with both access points for voice traffic and transition to the new access point exclusively for data traffic.

The cell coverage area can be adjusted as follows. The transmit power of an access point can be increased and its receiver attenuation decreased to effectively increase the access point's coverage area. Likewise, the transmit power of a neighboring access point can be decreased and its receiver attenuation increased, to effectively decrease the neighboring access point's coverage area. This complementary operation on two neighboring access points can effectively reallocate wireless terminal assignments without forcing a handoff. These and other techniques for altering the operational characteristics of the access points are described in further detail below.

If, on the other hand, it is determined that load balancing is not warranted at step 136, the operation can continue at step 132 such that load balancing operations can continue. Even if load balancing is performed, the operation can likewise continue at step 132 such that loading can be evaluated and load balancing considered continuously or periodically as an ongoing operational process of the network. Also, the operation can be repeated in an iterative or repetitive manner such that evaluation and balancing can be performed on a continuous or periodic basis, on a scheduled basis, or based on event triggers. Examples of event triggers include the entry of an additional wireless terminal to the network, the exit of a wireless terminal, the handoff of a wireless terminal the addition of a new access point to the network, QoS degradation and so on.

In further embodiments, the system can use the relative locations of the access points and wireless terminals in making reconfiguration determinations. For example, consider a scenario where the access points are femtocell access points located within a building. Further consider a scenario where location of the access points are known as is the configuration of the building, and it is known that certain areas within the building result in spotty coverage for particular access points in that area. Accordingly, the system may override the real-location decision based on this knowledge even if the signal strength by wireless terminal in this area of spotty coverage appears strong to the access point to which a handoff is being considered. To also avoid making a faulty decision in areas of spotty or fluctuating coverage, the controller can rely on average measurements rather than instantaneous determinations.

As described above, it may be desirable in certain circumstances to perform load balancing by controlling the characteristics of the access points to lead to a 'natural' handoff rather than by merely forcing a handoff. In another embodiment, when the system is considering a natural handoff by normal network operations, the system can gather loading data and perform an evaluation to determine whether an upcoming considered handoff (such as when a terminal is moving from one cell toward another) will result in unwanted imbalance. If so, the system may determine to delay the handoff, to make a different handoff, or to reconfigure the coverage area of one or more cells to delay the handoff or enable a different handoff.

Figure 6:
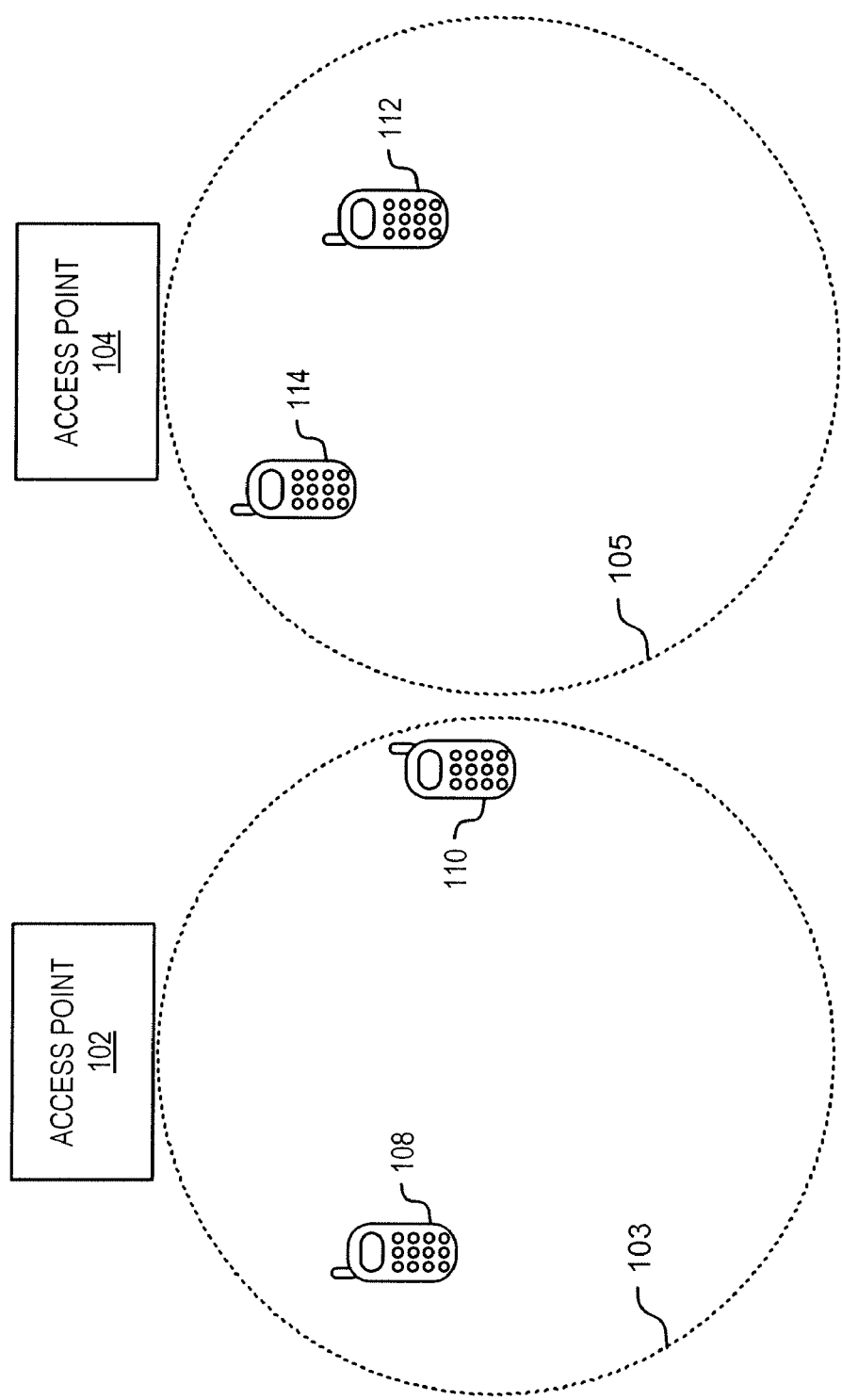
FIG. 6 is a diagram illustrating a two-dimensional spatial view an example network configuration shown in FIG. 4B.

FIG. 6 is a diagram illustrating a two-dimensional spatial view of the example network configuration shown in FIG. 4B. Accordingly, FIG. 6 illustrates two access points 102, 104 and their respective coverage areas 103, 105. As described above, wireless terminals 108, 110 are connected to the network via access point 102, and wireless terminals 112, 114 are connected via access point 104. Consider the scenario described above where wireless terminal 108 is a preferred user having high throughput requirements relative to the remaining wireless terminals 110, 112, 114. In this scenario, although the number of terminals registered to each access point is equal, the loads are imbalanced due to the high throughput requirements of wireless terminal 108.

Accordingly, a system controller can evaluate the number of wireless terminals registered to each access point, determine average and peak loads at the access points, determine locations of the wireless terminals relative to the access points, ascertain the path losses, and evaluate and change the loading if necessary. The location determination can be performed using signal strength measurements to determine relative positions, or through more absolute position determination mechanisms such as by triangulation among a plurality of access points (assuming adequate coverage by sufficient access points), or through GPS measurements made by the wireless terminal and communicated to the system controller. The system controller for such load balancing operations can be part of the network's access controller, distributed among the access points, or distributed among the access controller and multiple access points. Example mechanisms for signal strength measurement and path-loss determination are described in detail below.

Assume for a moment that wireless terminal 110 is on the edge of the coverage area for access point 102 as well as near the edge the coverage area for access point 104. In one embodiment, the system controller may determine for load balancing purposes it is appropriate to increase the transmit power of access point 104 while decreasing the receiver attenuation of access point 104 to thereby increase the coverage area 105 of access point 104. However, increasing the coverage area 105 of access point 104 may not by itself be sufficient to complete the load balancing appropriately. Indeed, performing these operations alone without adjusting the coverage area 103 of access point 102 can lead to further network problems such as increased interference on access point 104 by wireless terminal 110. Accordingly, the system controller can also be configured to decrease the transmit power of access point 102 and increase its receiver attenuation to thereby shrink its cellular coverage area.

In some wireless systems like UMTS, a wireless terminal 110 can be simultaneously connected to one or more access points 102, 104—referred to as being in soft-handoff state. During soft handoff, the wireless terminal can simultaneously receive signal from each of the access points and combine the received energy from the access points 102,104. However, for data services the wireless terminals may still have a primary serving cell, which is usually the access point with the strongest signal—in this case, access point 102. In such cases, the system controller can be configured to decrease the transmit power of access point 102 and increase its receiver attenuation to thereby change the primary serving cell to access point 104. This will mitigate the data load on access point 102. The example is provided in terms of a UMTS application, but after reading this description one of ordinary skill in the art will understand how a serving cell change can be achieved by adjusting the transmit power and receiver attenuation for load balancing in other systems.

Figure 7:
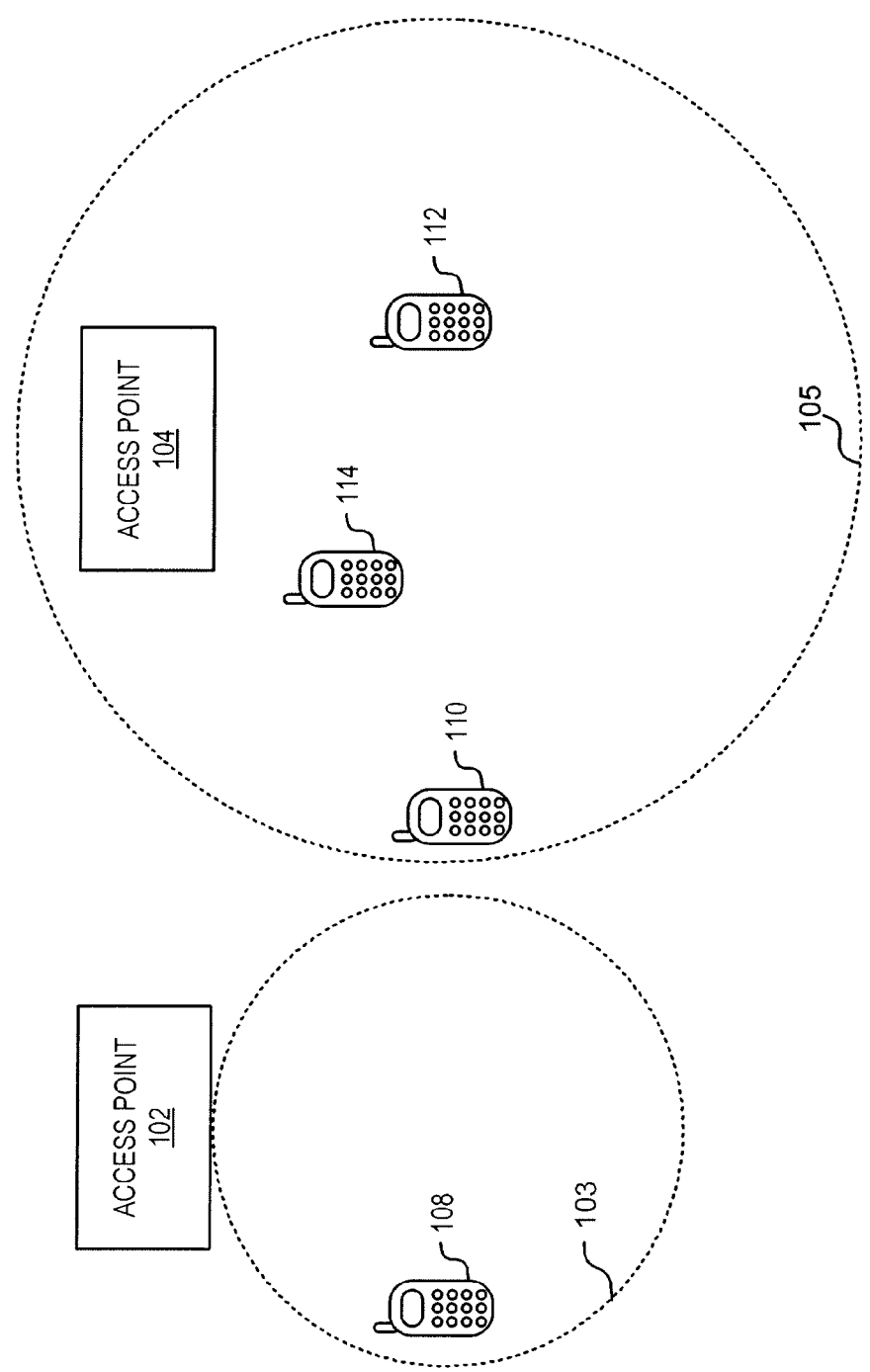
FIG. 7 is a diagram illustrating a two-dimensional spatial representation of the network illustrated in FIG. 6 with the cellular coverage areas of access points 102, 104 reconfigured as described above.

FIG. 7 is a diagram illustrating a two-dimensional spatial representation of the network illustrated in FIG. 6 with the cellular coverage areas of access points 102, 104 reconfigured as described above. As can be seen in this example illustration, the coverage area 105 of access point 104 has been increased to encompass wireless terminal 110, while the coverage area 103 of access point 102 has been decreased to exclude wireless terminal 110. Accordingly, with this reconfiguration of the coverage areas, routine network operations would effectuate a handoff of wireless terminal 110 from access point 102 to access point 104 thereby balancing the network.

Considerations of characteristics such as path losses between the wireless terminals and the access points, signal strengths, transmit headroom, maximum transmit powers, receiver sensitivity, and wireless terminal locations can be used to determine the extent by which cellular coverage areas of the access points need to be adjusted to effectuate a reallocation. For example, conventional RF link budget analysis can be performed and used to determine access point settings to capture a wireless terminal at new access point while dropping it at another without deleterious effects.

Figure 8:
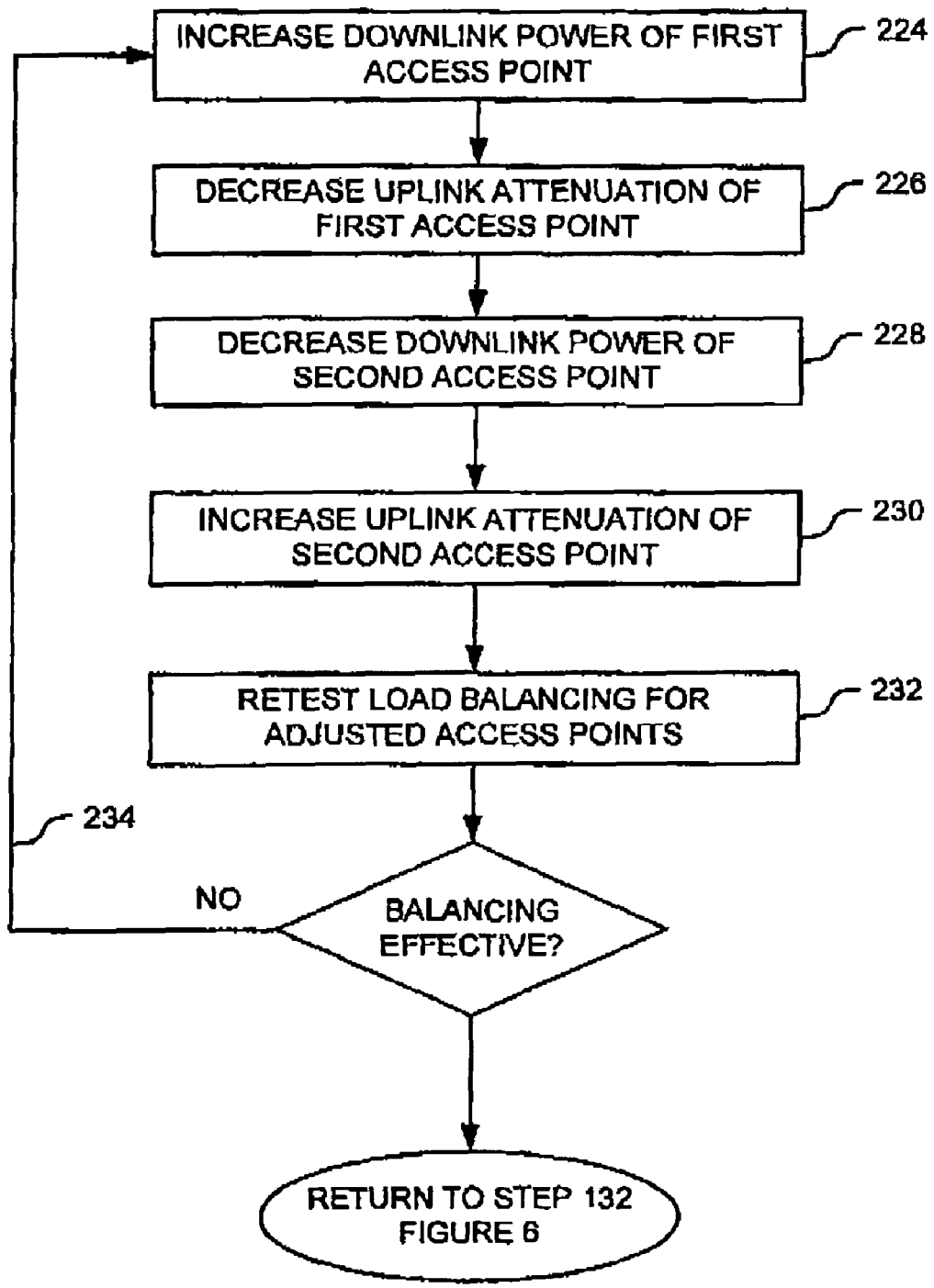
FIG. 8 is an operational flow diagram illustrating an example process for reallocating network assignments in accordance with one embodiment of the invention.

FIG. 8 is an operational flow diagram illustrating an example process for reallocating network assignments in accordance with one embodiment of the invention. Referring now to FIG. 8, consider a scenario where a wireless terminal 110 is being reallocated to a first access point 104 from a second access point 102. In this scenario in a step 224 the downlink power of the first access point is increased such that it is sufficient to overcome the path losses can provide adequate signal strength to wireless handset 110. Likewise, at step 226, the attenuation of the first access point 104 is decreased such that it can effectively receive uplink transmissions from wireless handset 110 within wireless handset 110's uplink transmit power capability.

To avoid interference with second access point 102 after the handoff has occurred (and in some instances to ensure the handoff does occur through normal network operations), a downlink transmit power of the second access point is decreased in step 228 such that its cell coverage shrinks to effectively exclude wireless terminal 110. Additionally, step 230 increases the uplink attenuation of the second access point to ensure that the reception area of cell 103 at least roughly matches the transmission area.

In fact, in many applications it is desirable to have a cell configuration where the uplink cell boundaries are symmetric with the downlink cell boundaries. If the uplink attenuation is maintained at a constant value while the downlink power is decreased, the downlink coverage area would be smaller than the uplink coverage area resulting obvious problems for normal cellular operations. Likewise, where the downlink power of a given access point is increased to pick up a new wireless terminal from a neighboring access point and the attenuation is unchanged, in some applications the wireless terminal would have to transmit a higher power to reach the access point, which can lead to a higher spillover interference at the neighboring access point.

To balance the uplink and downlink cell boundaries, some embodiments adjusts the uplink attenuation in coordination with adjustments in the transmit power. This allows the mobile terminal to perceive its uplink connection to the serving downlink access point as the preferred uplink connection as well. This can help to avoid additional interference in the system.

With these changes, in some embodiments, the reconfigured cells are sufficient to cause a handoff from wireless terminal 110 from access point 102 to access point 104 through routine network operations. In other embodiments, the handoff can be forced to ensure that wireless terminal 110 is reassigned to access point 104.

In some embodiments, in a step 232, the load balance is re-examined after the power control. This re-examination can be performed to determine whether wireless terminal 110 was in fact reassigned as a result of the power control operations. If the reassignment did not take place, the system can determine whether to make additional adjustments to the cellular structure as illustrated by flow line 134, or whether to do a forced handoff with the now-current power settings. The operation can return to step 132 of FIG. 5 where network loading is evaluated and load balancing performed if warranted.

The embodiment described above with reference to FIG. 8 describes a coverage area adjustment of either or both access points at a level of adjustment such that handoff occurs, or a forced handoff is practical. In alternative embodiments, rather than adjusting the cell coverage area or areas in one step to achieve handoff, the cell coverage area adjustments can be performed more gradually. In either case, the adjustments can be performed in an iterative manner, but in some applications the changes are made more gradually so as not to destabilize the network with large changes or so as to not overcorrect the situation. For example, small changes in coverage area of one or more access points (for example, small changes to either the first or second access point or both in the example of FIG. 8) can be made, the network reevaluated after the change, and an additional change made if necessary or desirable. This process can repeat in an iterative fashion until the desired level of loading is achieved. The magnitude of the change in each iteration can be determined based on the network type and configuration. Accordingly, it is not necessary to change coverage areas in one step, nor is it necessary to change coverage areas of more than one access point to achieve the desired reconfiguration.

As discussed above, some embodiments rely on path-loss information from multiple wireless terminals to multiple access points to make reconfiguration determinations. This information can be utilized by the control system in changing the topology of the network to achieve load balancing across multiple access points with multiple wireless terminals. Information such as path loss between a terminal and an access point, signal strength and location information can all be used to evaluate whether a reconfiguration is possible. For example, this information can be used to determine whether a terminal is on the edge of a given cell and within potential range of another cell such that adjustments in coverage area will be effective or whether a handoff is possible.

In a UMTS system, for example, the radio network controller can be configured to instruct or command a wireless terminal to measure the downlink pilot (DL-CPICH) strengths from base stations (nodeBs or eNodeBs) other than the base station that is currently serving the wireless terminal. This is typically done to assist soft-handoff between base stations. However, this information, in some embodiments, may also be used for interference mitigation. Because the radio network controller is aware of the power at which the downlink pilot is transmitted from each base station, the measured receive power value at the wireless terminal provides a good estimate of the path loss in the downlink direction. Even though the uplink and downlink frequency bands in a Frequency Division Duplex (FDD) system typically experience independent fading, a time-averaged value of the downlink path-loss can provide an acceptable estimate of the time-averaged value of the uplink path loss. This is because the timescale at which fading typically occurs (e.g., tens of milliseconds) is much faster than the timescale at which the path-loss itself typically changes due to the movement of the wireless terminal (e.g., tens of seconds).

In another UMTS embodiment, the radio network controller can be configured to request a non-serving base-station to measure the uplink receive power on the pilot transmitted on the UL-DPCCH (the uplink dedicated physical control channel) of a wireless terminal in question. In a UMTS system, each wireless terminal transmits using a unique scrambling code, which can be decoded by the base station. The base station can be configured to allocate a receiver processing chain, measure the pilot value and report it to the radio network controller. The wireless terminal also periodically transmits an uplink power headroom indicator, which quantifies the difference between its current transmit power and its maximum transmit power, providing information to the base station of the terminal's available power resources. This can be, for example, the UE power headroom, or UPH, quantified as a ratio of the maximum transmission power of the wireless terminal and the corresponding DPCCH code power. In addition, the radio network controller is aware of the capability class of the wireless terminal, which can also quantify its maximum transmit power. The uplink path loss from a particular wireless terminal to a specific base station may be sufficiently determined from the uplink receive power on the UL-DPCCH pilot, the UE power headroom and the maximum transmit power of the wireless terminal, which are typically known at the base station.

As stated above, in one embodiment, the control system deployed as a module in an access controller is configured to receive information from the access points, make determinations as to load balancing, and direct reconfiguration efforts. For example, in one embodiment, the access controller can be configured to receive load information from the access points, determine path loss information between the wireless terminals and the access points, and issue instructions to one or more access points to adjust their coverage areas in order to effectuate a change in topology. In one embodiment, this is done in a dynamic manner in response to changes in load over a relatively short time period. As stated, load balancing can be a continuous process, event driven, performed at periodic intervals, or performed as scheduled or it can be event driven. For example, the load balancing can be scheduled on a periodic basis to occur at predetermined time slots or at predetermined intervals. An event driven process might be triggered based on the occurrence of events such as the introduction of one or more new terminals to the network, increased error rates or error conditions, reported throughput delays, and so on.

As also stated herein, after the reconfiguration of the coverage areas, wireless terminals may handoff naturally or through routine network operations based on the new RF conditions. In other examples, the handoff may be forced with or without a change in cell coverage area(s). In one example UMTS embodiment, the radio network controller (RNC) is responsible for making handoff decisions. The wireless terminals simply report radio network measurements that are utilized by the RNC to make handoff decisions. As the topology changes, the RNC may act in concert and handoff wireless terminals to neighboring cells based on the new measurements received.

As another example, in WiMAX embodiments, the handoffs can be initiated by the wireless terminals. Based on the new network topology and measurements of the modified RF environment, wireless terminals may request handoffs to neighboring cells.

Figure 9:
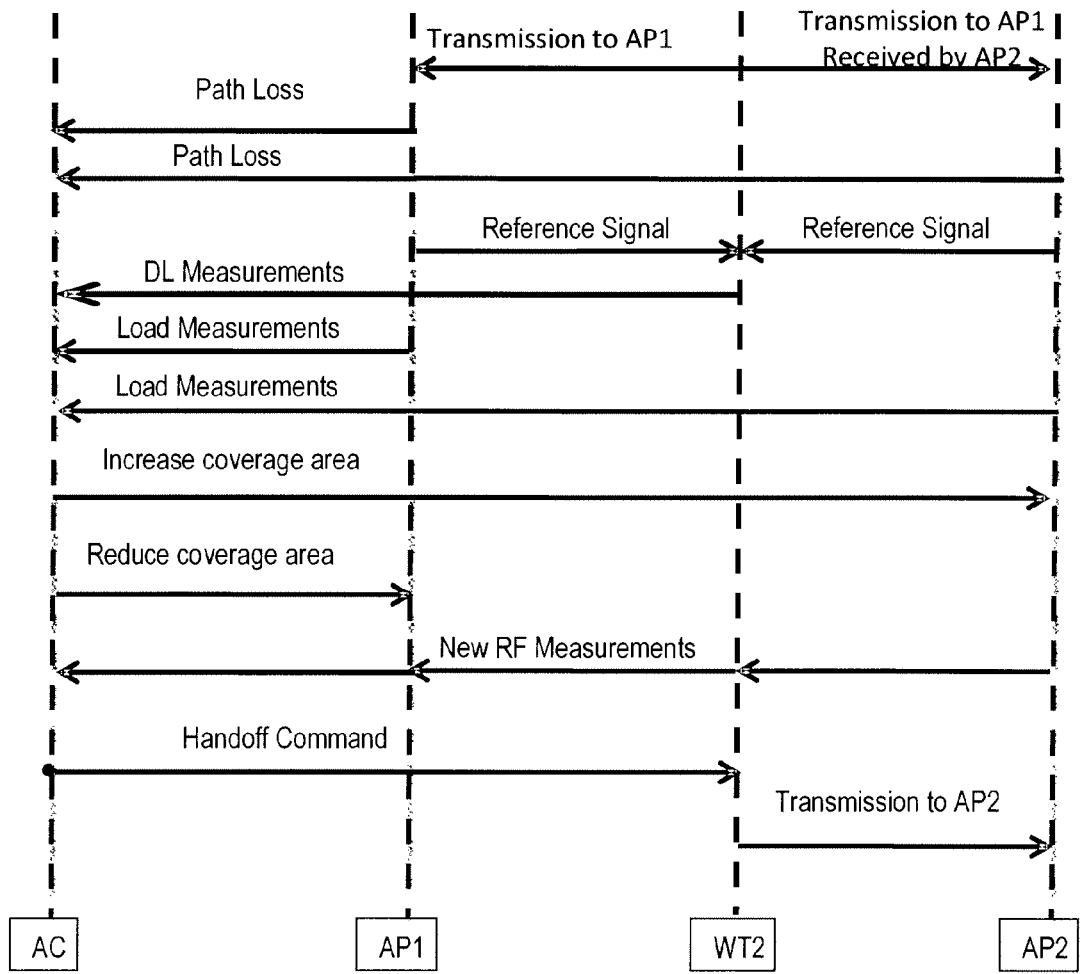
FIG. 9 is a diagram illustrating an example message exchange between wireless terminals (WT), access points (AP) and an access controller (AC) in accordance with one embodiment of the invention.

FIG. 9 is a diagram illustrating an example message exchange between wireless terminals (WT), access points (AP) and an access controller (AC) in accordance with one embodiment of the invention. This example message flow corresponds to the reconfiguration scenario of the network as described above with reference to FIGS. 6 and 7. Referring now to FIG. 9, wireless terminal 110 (WT2) makes a routine transmission to access point 102. Both access points in range of the wireless terminal WT2 (in this example, access points 104, 102) provide RF measurements to the access controller for a path loss determination. Additionally, access points 102, 104 provide load measurements to the access controller 106. Wireless terminal 110 also receives a downlink reference signal from the access points and can report signal measurements to the access controller 106.

In response to these measurements and the received information, access controller 106 can evaluate the data and determine whether a reconfiguration is possible and whether possible reconfigurations would be useful from a load balancing perspective. For example, access controller 106 can determine whether wireless terminal 110 is far enough away from access point 102 and close enough to access point 104 such that a handoff is possible within network operating constraints, and whether, based on loading, such a handoff would result in a more balanced network or remove a network bottleneck.

If reconfiguration is warranted, access controller 106 instructs either or both of the following: access point 104 to increase its coverage area; and access point 102 to reduce its coverage area. Then, new RF measurements are provided from the access points 102, 104 to the access controller 106 and the RF environment is evaluated. In response, and as a result of the new cell topology, a handoff command is issued by the access controller such that wireless terminal 110 is registered to the network with access point 104. As stated above, this can be done iteratively and these changes made gradually so as not to overcompensate or destabilize the network.

The techniques described in the context of example embodiments are also applicable to a distributed architecture that does not have an access controller. Consider one embodiment in which the access points are coupled to each other in a peer-to-peer manner. The access points can be configured to conduct a discovery procedure by which the access points discover each other, or the access points can be manually provisioned with this knowledge. Accordingly, such methodologies can be used to allow the access points in the peer network to compile a "neighbor list" of their respective peer access points.

In one embodiment, the access points are configured to instruct their respective registered wireless terminals to measure a downlink reference signal and report this measurement back to the access point. One example of such a reference signal is the DL-CPICH in a UMTS embodiment, or a downlink preamble or common pilots in an 802.16 WiMAX embodiment. In some embodiments, the reference signals can also include information to disclose the identity of the transmitting access points. For instance, the combination of primary and secondary synchronization channels, the DL-CPICH and the broadcast channel in UMTS systems can be used to reveal the identity of the transmitting access point.

In such embodiments, each access point receives downlink reference measurements collected by its registered wireless terminals. Each measurement can be, for example, reported as a pairwise-entity $(p_i, s_i)$ where $p_i$ is the measured value of the downlink reference signal and $s_i$ is the identity of the transmitting access point (determined through a combination of downlink reference signals). Because each access point has a neighbor list, it communicates the identity of the wireless terminals to its neighbors.

Figure 10:
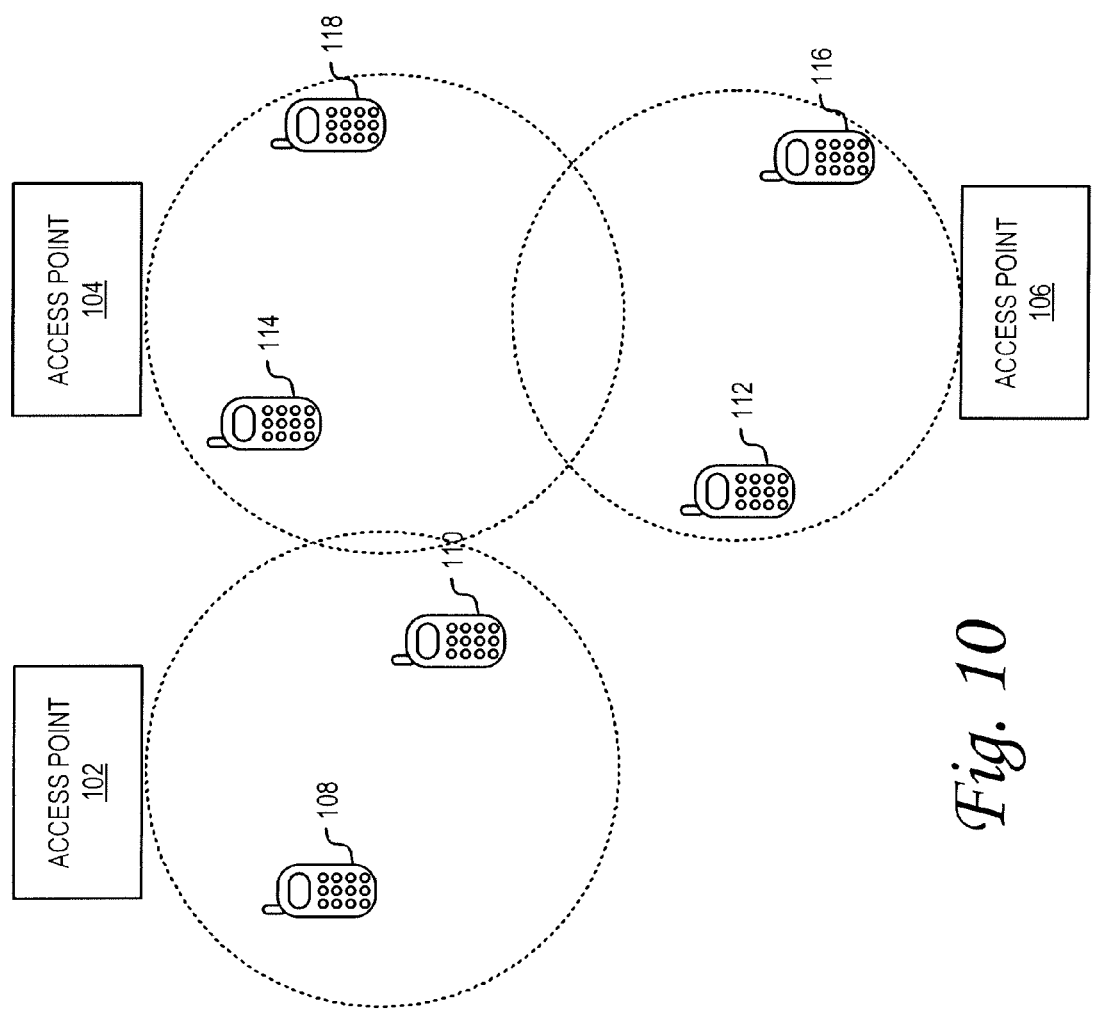
FIG. 10 is a diagram illustrating an example of a standard network configuration with initial cell coverage areas in accordance with one embodiment of the invention.
Figure 11:
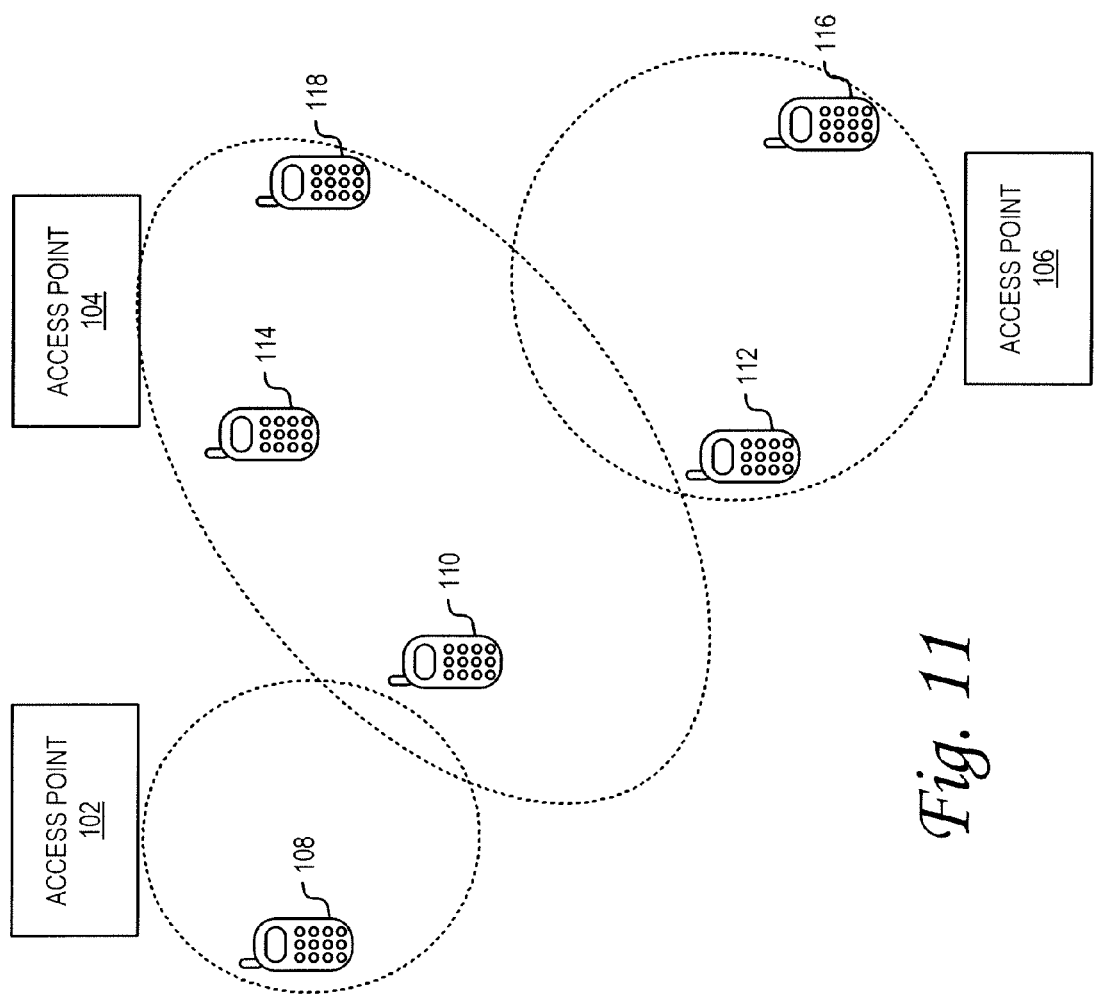
FIG. 11 is a diagram illustrating an example of a reconfigured network using a combination of steerable antennas and power control in accordance with one embodiment of the invention.

In addition to the embodiments described above where power and attenuation control techniques can be used to adjust the cell coverage areas of multiple access points, or other techniques can be used to change cell coverage areas and drive network reallocation. For example, in some embodiments, directional or steerable antennas or antenna arrays can be used with access points to custom shape cell coverage areas for reallocation purposes. beam steering or beam shaping techniques can be used to adjust the cell coverage areas of access points for reallocation purposes. These techniques can be used in place for in addition to the power control techniques described above to form customized cell patterns for desired coverage areas. An example of this is described with reference to FIGS. 10 and 11. FIG. 10 is a diagram illustrating an example of a standard network configuration with initial cell coverage areas. FIG. 11 is a diagram be reconfigured network using a combination of steerable antennas and power control.

FIG. 10 shows three access points 102, 104, 106 each with to wireless terminals in their respective coverage areas. Again, consider an example where wireless terminal 108 is preferred user and requires high priority high throughput service. Accordingly, it is desired to reallocate user terminal 110 to either access point 104 or access point 106 to perform load balancing. However, increasing the coverage area of access point 104 as described above with reference to FIG. 7 can result interference with respect to wireless terminals 112 and 116.

FIG. 11 shows the effects of beam steering to cause wireless terminal 110 to be handed off to access point 104. In addition, power and attenuation control techniques are used to reduce the coverage area of access point 102 to provide dedicated coverage to wireless terminal 108. As also illustrated in this example, it was not necessary to adjust the coverage area of access point 106 accomplish a desired results.

Figure 12:
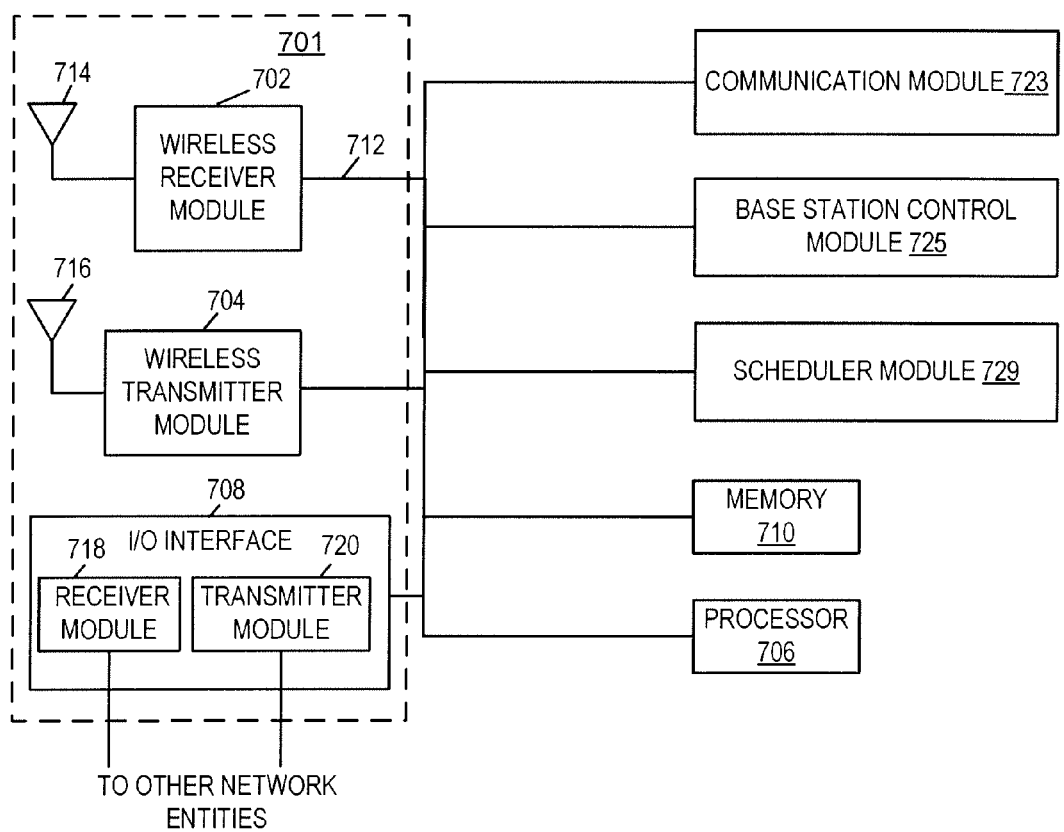
FIG. 12 is a diagram illustrating a block diagram for an example wireless access point or base station in accordance with one embodiment of the invention.

FIG. 12 is a diagram illustrating a block diagram for an example wireless access point or base station in accordance with one embodiment of the invention. In particular, the example architecture illustrated in FIG. 12 shows an embodiment of an access point architecture 700 configured to receive the results of an interference cancellation operation from a neighboring access point and to control the uplink transmission power of one or more of its wireless terminals based on the interference cancellation results. With reference to the example described above in conjunction with FIGS. 6 and 7, architecture 700 is an example architecture that can be implemented to perform the functions described of access point 504.

In this example architecture, access point 700 includes a communication module 701, a processor 706, and memory 710. These components are communicatively coupled via a bus 712 over which these modules may exchange and share information and other data. Communication module 701 includes wireless receiver module 702, a wireless transmitter module 704, and I/O interface 708.

An antenna 716 is coupled to wireless transmitter module 704 and is used by access point 700 to wirelessly transmit downlink radio signals to wireless terminals with which it is connected. These downlink RF signals can include voice and data communications sent to the wireless terminals registered with the access point 700 to allow routine communication operations of the cell. The downlink RF signals can also include uplink power control signals that are sent to registered wireless terminals to allow access point 700 to control the uplink transmit power of the wireless terminals that are communicating with access point 700 as a point of attachment to the cell. Preferably, access point 700 is configured to direct specific uplink power control signals to individual wireless terminals to allow individualized power control of the various wireless terminals associated with the access point 700. For example, where only one wireless terminal is causing interference to a neighboring access point, the transmit power of that wireless terminal can be individually controlled to mitigate or reduce the level of interference it is causing. Likewise, when that wireless terminal ceases to be a source of interference (such as, for example, when it moves out of range of the neighboring access point), its power level can be individually increased.

Antenna 714 is included and coupled to wireless receiver module 702 to allow second access point 700 to receive signals from various wireless terminals within its reception range. Received signals can include voice and data communications from a wireless terminal in the access point's cell coverage area for routine communication operations. Accordingly, signals such as wireless uplink signals from registered wireless terminals that have a current connection with access point 700 are received. Also, access point 700 typically receives interfering uplink signals generated by wireless terminals that are registered to or using another access point as a point of attachment, and that are within range of access point 700. These signals can present unwanted interference to access point 700.

Although two antennas are illustrated in this and other example architectural drawings contained herein, one of ordinary skill in the art will understand that various antenna and antenna configurations can be provided as can different quantities of antennas. For example, transmit and receive functions can be accommodated using a common antenna or antenna structure, or separate antennas or antenna structures can be provided for transmit and receive functions as illustrated. In addition, antenna arrays or other groups of multiple antennas or antenna elements, including combinations of passive and active elements, can be used for the transmit and receive functions.

I/O interface module 708 is provided in the illustrated example, and can be configured to couple access point 700 to other network nodes. These can include nodes or equipment such as, for example, other access points, and an access controller. In this example architecture, the I/O interface module 708 includes a receiver module 718 and a transmitter module 720. Communications via the I/O interface module can be wired or wireless communications, and the transmitter and receiver contained therein include line drivers, receivers radios, antennas or other items, as may be appropriate or the given communication interfaces.

Transmitter module 720 is configured to transmit signals that can include voice, data and other communications to the access controller. Transmitter module 720 can also be configured to send signals conveying interference cancellation information used in an interference cancellation operation at an access controller or other access points. Examples of information that can be shared interference cancellation operations include information such as that described above with reference to FIGS. 6 and 7.

Receiver module 718 is configured to receive signals from other equipment such as, for example, other access points (in some embodiments, via the access controller), and an access controller. These signals can include voice, data and other communications from the access controller or other equipment. Receiver module 718 can also be configured to receive signals including signals indicating a level of success of interference cancellation at a first access point regarding interference to the first access point caused by transmission from a first wireless terminal.

Memory 710 in the illustrated example is configured to store data and other information as well as operational instructions such as access point control routines. The processor 706, which can be implemented as a CPU for example, is configured to execute instructions or routines and to use the data and information in memory 710 in conjunction with the instructions to control the operation of the access point 700. For example, access point control routines can include instructions to enable processor 706 to perform normal access point operations for data transmission between the wireless terminals and the access controller as well as to perform operations described herein with respect to load balancing and network configuration.

The example architecture illustrated in FIG. 8 includes a communication module 723 configured to cause the access point to perform communication operations and implement communication protocols. These can include, for example routine access point or base station communication operations. For example, in a UMTS environment, the communication module can be configured to cause the access point to perform specified and desired enodeB communication operations. The example also illustrates a base station control module 725 configured to cause the access point to perform base station operations. For example, in a UMTS environment, the base station module can be configured to cause the access point to perform specified and desired enodeB base station operations. In addition, these modules 723, 725 (or additional modules) can be configured to cause the access point to perform the operations described above for network evaluation and reconfiguration. For example, these modules can be configured to cause the access point to determine and report wireless terminal assignments, path loss measurements, and so on. Likewise, these modules can be configured to cause the access point to adjust its cell coverage area in response to reconfiguration instructions. A scheduling module 726 can also be provided to control transmission scheduling or communication resource allocation.

In addition to data and information maintained by the access point to perform routine base station operations, memory 710 can also include information used for load determining balancing operations. This can include information such as, for example, entries for active mobile terminals listing active sessions conducted by the user as well as information identifying the mobile station or wireless terminal being used to conduct the sessions.

Servers or host devices may be implemented using configurations that are the same as or similar to the architecture of the access point shown in FIG. 8 but was interfaces and or modules suited to the server or host device requirements.

Figure 13:
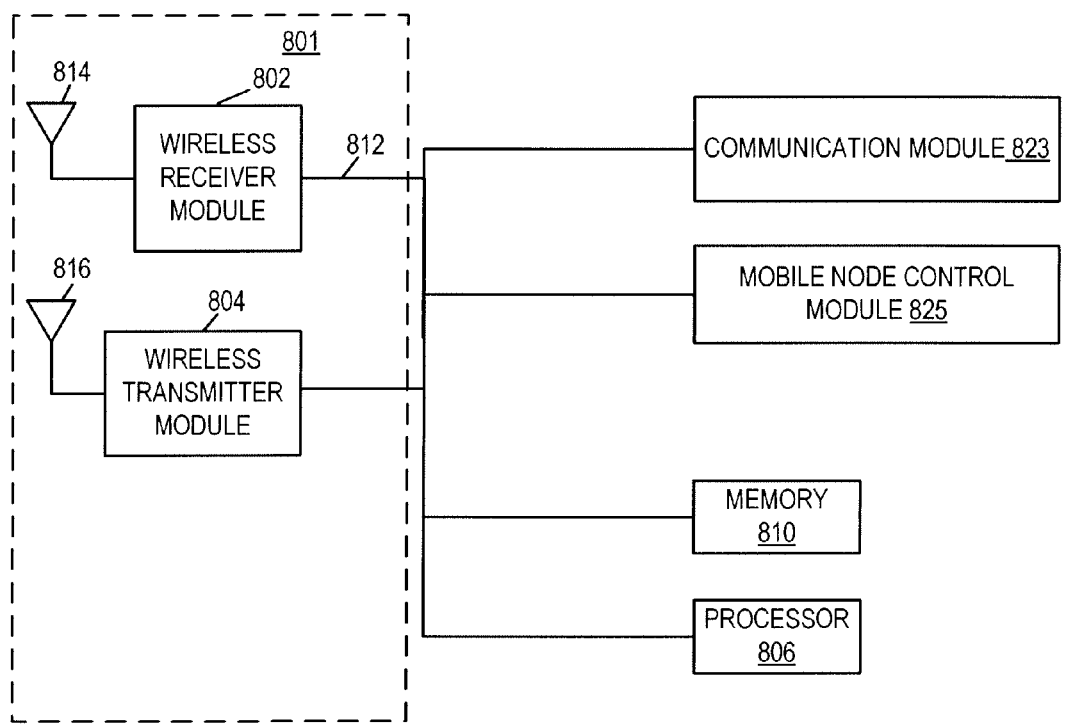
FIG. 13 is a diagram illustrating an example architecture for a wireless terminal in accordance with one embodiment of the invention.

FIG. 13 is a diagram illustrating an example architecture for a wireless terminal in accordance with one embodiment of the invention. Referring now to FIG. 13, wireless terminal also includes a communication module 801 similar to communication module 701 contained within the example access point. The communication module eight of one enables the wireless terminal to communicate voice and data information as well as control information with its serving access point. Accordingly, user information such as voice and data traffic can be communicated between the wireless terminal and the access point and ultimately between the wireless terminal and other devices (such as, for example, the core network) for routine device operations. Likewise, the communication module can be configured to receive control information from the access point to control the wireless terminal to perform desired operations can transmit data, infrastructure, or other control information such as pilot signals, scrambling codes, and so on.

Processor 806 and memory 810 are also typically included in the can be utilized to perform device functions of the wireless terminal. Various modules can be included to perform device operations, both routine wireless terminal device operations as well as specific operations described above for network monitoring and reconfiguration. These can include medications module 823 and mobile node control module 825. Although not illustrated, user, device and session resource information can be stored in memory 810 to facilitate operations.

Figure 14:
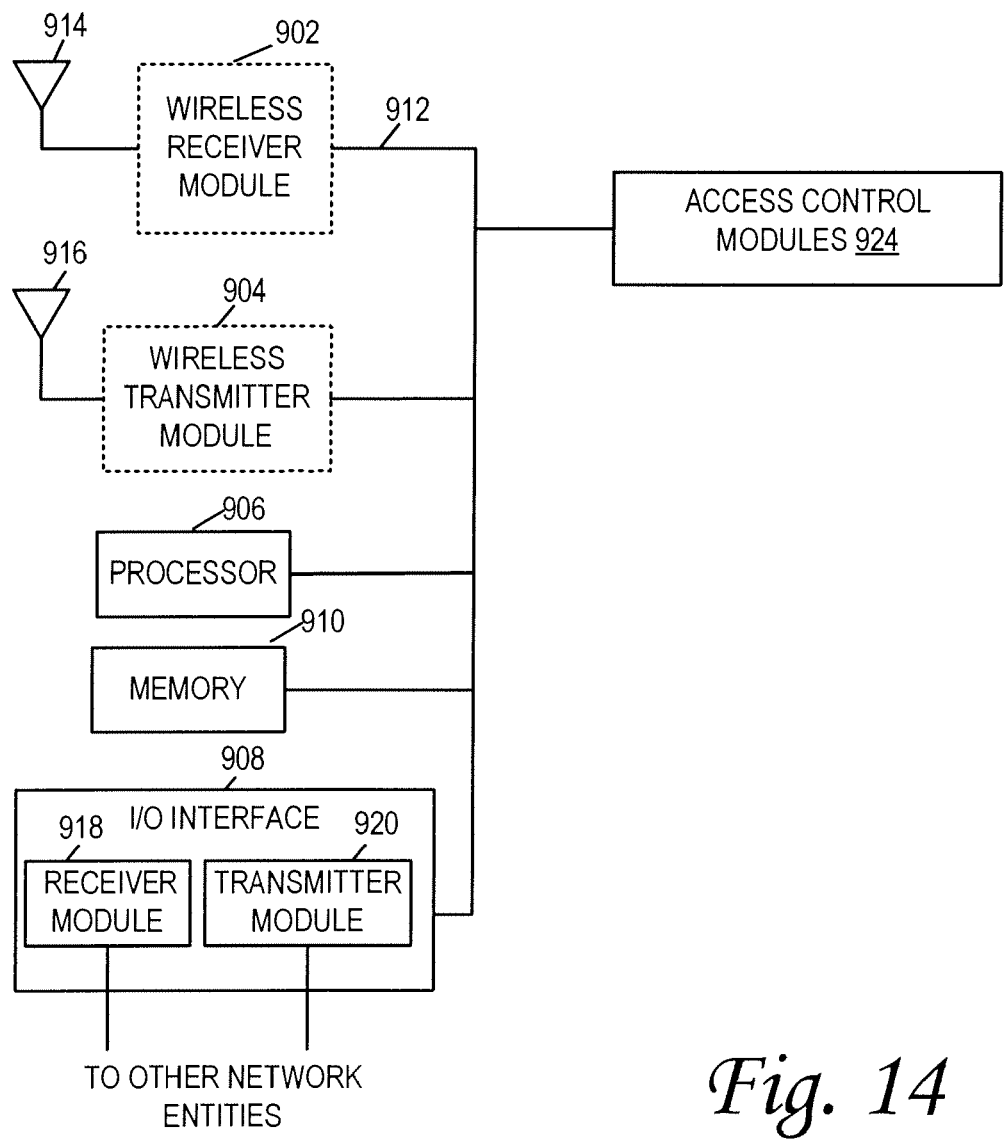
FIG. 14 is a diagram illustrating an example architecture for a control node configured to perform the functions described above for network operations, measurement and reconfiguration in accordance with one embodiment of the invention.
Figure 15:
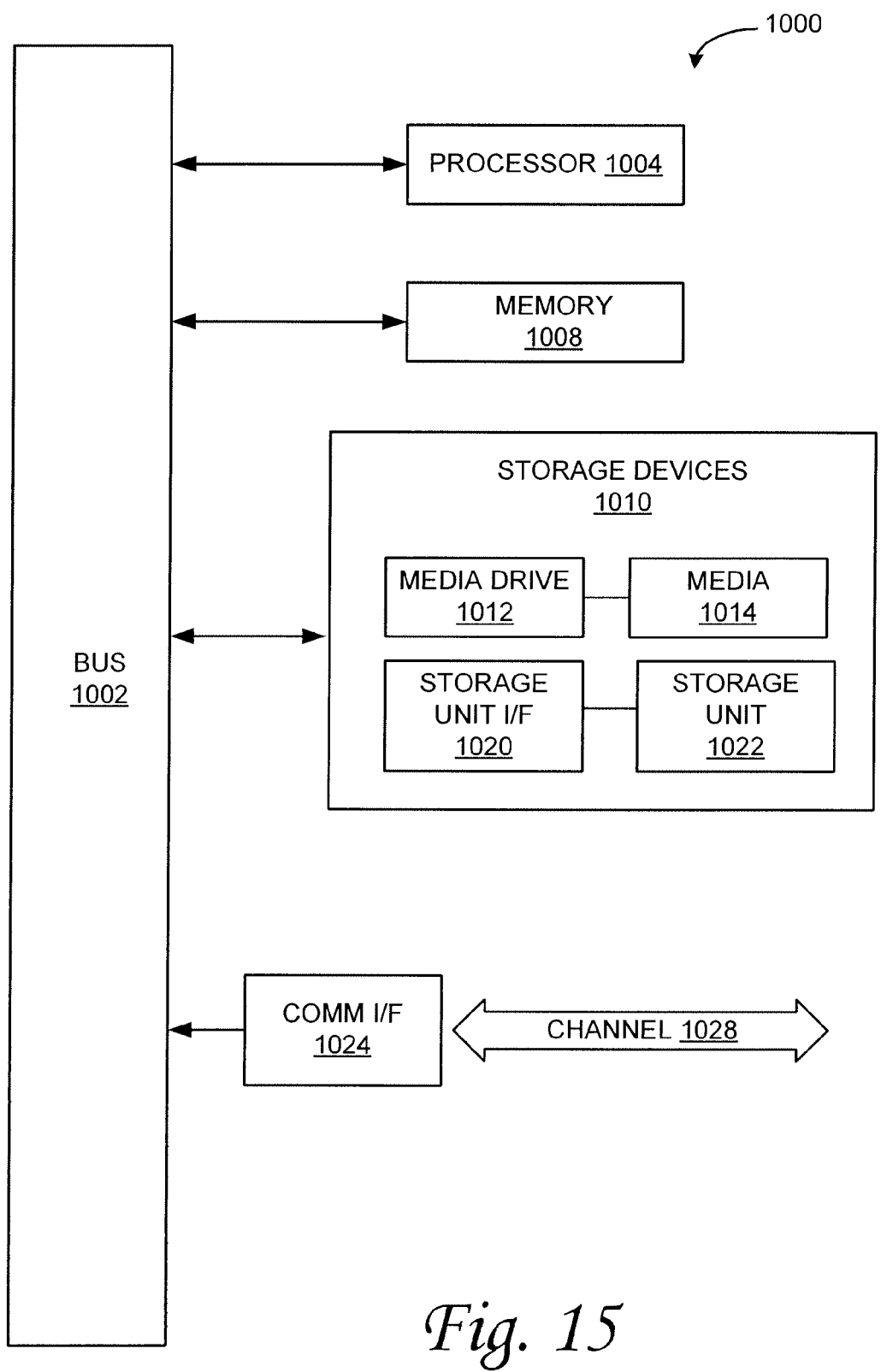
FIG. 15 illustrates an example computing module that may be used in implementing various features of embodiments of the invention.

FIG. 14 is a diagram illustrating an example architecture for a control node configured to perform the functions described above for network operations, measurement and reconfiguration in accordance with one embodiment of the invention. Referring now to FIG. 14, the architecture includes a wireless receiver module 902 with an antenna 914, a wireless transmitter module 904 with an antenna 916, a processor 906, memory 910 and an I/O interface 908 that includes a receiver module 918 and a transmitter module 920. Wireless receiver module 902 and transmitter module 904 can be used to transfer data and control information among the control node 514 and other network entities using a number of wireless communication schemes or protocols. Similarly, I/O interface 908 used to transfer data and control information among the control node 514 and other network entities. For example, I/O interface 908 can be Ethernet interface to connect a control node such as an access controller 514 to various access points, to a gateway for connection to the core network, or to other network entities.

Although not individually illustrated, an exemplary access point architecture also includes a plurality of access control modules 924 to perform features and functions described above and to perform other control node functions such as, for example, routine base station controller functions such as traffic routing among base stations and the gateway, base station control and other such functions. These can include modules such as a detection module configured to detect changes in access point loading information; an evaluation module configured to evaluate access point loading across multiple access points to determine whether a loading imbalance exists in the network and a control module configured to control access point coverage areas and further configured to change the coverage area of an access point in response to changes in access point loads. Additionally, a handoff module can be provided and configured to hand off a wireless terminal from a first access point to a second access point as a result of a change in coverage area of either or both of the first or second access point; and a determination module can be provided and configured to determine whether a change in coverage area is warranted before changing the coverage area in response to a determined loading imbalance.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 1100. After reading this description, it will become apparent to a person skilled in the relevant art how to implement the invention using other computing modules or architectures.

Referring now to FIG. 13, computing module 1100 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1100 might include, for example, one or more processors, controllers, control modules, or other processing devices, such as a processor 1104. Processor 1104 might be implemented using a general-purpose or special-purpose processing engine such as, for example, a microprocessor, controller, or other control logic. In the illustrated example, processor 1104 is connected to a bus 1102, although any communication medium can be used to facilitate interaction with other components of computing module 1100 or to communicate externally.

Computing module 1100 might also include one or more memory modules, simply referred to herein as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage mechanism 1110, which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive might be provided. Accordingly, storage media 1114 might include, for example, a hard disk, a floppy disk, magnetic tape, cartridge, optical disk, a CD or DVD, or other fixed or removable medium that is read by, written to or accessed by media drive 1112. As these examples illustrate, the storage media 1114 can include a computer usable storage medium having stored therein computer software or data.

In alternative embodiments, information storage mechanism 1110 might include other similar instrumentalities for allowing computer programs or other instructions or data to be loaded into computing module 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 1100 might also include a communications interface 1124. Communications interface 1124 might be used to allow software and data to be transferred between computing module 1100 and external devices. Examples of communications interface 1124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1124 might typically be carried on signals, which can be electronic, electromagnetic (which includes optical) or other signals capable of being exchanged by a given communications interface 1124. These signals might be provided to communications interface 1124 via a channel 1128. This channel 1128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of load adjustment in a communications network comprising a plurality of access points, and further comprising a plurality of wireless terminals, wherein a wireless terminal communicates with the network by way of an assigned access point, the method comprising:
   monitoring access point loading for a plurality of access points;
   evaluating access point loading across multiple access points to determine whether a loading imbalance exists in the network; and
   changing a coverage area of an access point to mitigate a determined loading imbalance,
   wherein changing the coverage of an access point comprises at least one of:

adjusting a beam pattern of a first access point so as to at least partially exclude the wireless terminal from the first coverage area; and adjusting a beam pattern of a second access point so as to at least partially include the wireless terminal in the second coverage area, wherein changing the coverage of an access point is performed solely by adjusting a beam pattern and in which no transmit power changes of the access point are made.

2. The method of claim 1, further comprising handing off a wireless terminal from a first access point to a second access point as a result of the change in coverage area of either or both of the first and second access point.

3. The method of claim 2, wherein the handoff is forced or the handoff occurs automatically as a result of the change in coverage area.

4. The method of claim 1, wherein changing the coverage of an access point comprises decreasing a first coverage area of a first access point so as to at least partially exclude the wireless terminal from the first coverage area.

5. The method of claim 1, wherein changing the coverage of an access point comprises increasing a second coverage area of a second access point so as to at least partially include the wireless terminal in the second coverage area.

6. The method of claim 1, wherein changing the coverage of an access point comprises decreasing a first coverage area of a first access point so as to at least partially exclude the wireless terminal from the first coverage area and increasing a second coverage area of a second access point so as to at least partially include the wireless terminal in the second coverage area.

7. The method of claim 1, further comprising a step of determining whether a change in coverage area is warranted before changing the coverage area in response to a determined loading imbalance.

8. The method of claim 7, wherein determining whether a change in coverage area is warranted comprises comparing a loading of an access point to a threshold loading level for that access point.

9. The method of claim 1, wherein determining whether a change in coverage area is warranted comprises comparing a loading of an access point to a loading of another access point.

10. The method of claim 1, wherein adjusting a beam pattern comprises steering the beam to arrive at a desired beam pattern.

11. The method of claim 1, wherein the steps of monitoring and evaluating are performed at a scheduled time, periodically or on an event-driven basis.

12. The method of claim 1, wherein the steps of determining, evaluating and changing are performed iteratively.

13. A control node for use in a communications network, comprising:

a detector that detects access point loading information; and an evaluator that evaluates access point loading across multiple access points to determine whether a loading imbalance exists in the network; and a controller that controls access point coverage areas and that changes the coverage area of an access point in response to changes in access point loads, wherein the controller changes the coverage of an access point by:

adjusting a beam pattern of a first access point so as to at least partially exclude the wireless terminal from the first coverage area;

adjusting a beam pattern of a second access point so as to at least partially include the wireless terminal in the second coverage area, wherein changing the coverage of an access point is performed solely by adjusting a beam pattern and in which no transmit power changes of the access point are made.

14. The control node of claim 13, wherein said controller changes the coverage of one or more access points by either signaling a first access point to increase the coverage area of first access point, or signaling a second access point to decrease the coverage area of the second access point, the second access point being located adjacent said first access point.

15. The control node of claim 13, wherein said controller changes the coverage of one or more access points by both signaling a first access point to increase the coverage area of first access point, and signaling a second access point to decrease the coverage area of the second access point, the second access point being located adjacent said first access point.

16. The control node of claim 13, further comprising a handoff module that hands off a wireless terminal from a first access point to a second access point as a result of a change in coverage area of either or both of the first or second access point.

17. The control node of claim 13, wherein changing the coverage of an access point comprises decreasing a first coverage area of a first access point so as to at least partially exclude the wireless terminal from the first coverage area, or increasing a second coverage area of a second access point so as to at least partially include the wireless terminal in the second coverage area.

18. The control node of claim 13, wherein changing the coverage of an access point comprises decreasing a first coverage area of a first access point so as to at least partially exclude the wireless terminal from the first coverage area, and increasing a second coverage area of a second access point so as to at least partially include the wireless terminal in the second coverage area.

19. The control node of claim 13, wherein the evaluator evaluates loading to determine whether a change in coverage area is warranted before changing the coverage area in response to a determined loading imbalance.

20. The control node of claim 19, wherein determining whether a change in coverage area is warranted comprises comparing a loading of an access point to a threshold loading level for that access point.

21. The control node of claim 13, wherein adjusting a beam pattern comprises steering the beam to arrive at a desired beam pattern.

22. The control node of claim 13, wherein the determining, evaluating and changing are performed at a scheduled time, periodically or on an event-driven basis.

23. The control node of claim 13, wherein determining, evaluating and changing are performed iteratively.

24. A non-transitory computer readable medium comprising computer executable instructions stored thereon, which, when executed cause a control node to perform a method of load adjustment in a communications network comprising a plurality of access points, and further comprising a plurality of wireless terminals, wherein a wireless terminal communicates with the network by way of an assigned access point, the executable instructions comprising instructions to cause the control node to perform the steps of:

monitoring access point loading for a plurality of access points;

evaluating access point loading across multiple access points to determine whether a loading imbalance exists in the network; and changing a coverage area of an access point to mitigate a determined loading imbalance, wherein changing the coverage of an access point comprises:

adjusting a beam pattern of a first access point so as to at least partially exclude the wireless terminal from the first coverage area;

adjusting a beam pattern of a second access point so as to at least partially include the wireless terminal in the second coverage area, wherein changing the coverage of an access point is performed solely by adjusting a beam pattern and in which no transmit power changes of the access point are made.

25. The non-transitory computer readable medium of claim 24, wherein the executable instructions further comprise instructions to cause control node to handoff a wireless terminal from a first access point to a second access point as a result of a change in coverage area of either or both of the first and second access point.

26. A non-transitory computer readable medium of claim 25, wherein the handoff is forced or the handoff occurs automatically as a result of the change in coverage area.

27. The non-transitory computer readable medium of claim 24, wherein changing the coverage of an access point comprises decreasing a first coverage area of a first access point so as to at least partially exclude the wireless terminal from the first coverage area.

28. The non-transitory computer readable medium of claim 24, wherein changing the coverage of an access point comprises increasing a second coverage area of a second access point so as to at least partially include the wireless terminal in the second coverage area.

29. The non-transitory computer readable medium of claim 24, wherein changing the coverage of an access point comprises decreasing a first coverage area of a first access point so as to at least partially exclude the wireless terminal from the first coverage area and increasing a second coverage area of a second access point so as to at least partially include the wireless terminal in the second coverage area.

30. The non-transitory computer readable medium of claim 24, wherein the executable instructions further comprise instructions to cause control node to determine whether a change in coverage area is warranted before changing the coverage area in response to a determined loading imbalance.

31. The non-transitory computer readable medium of claim 30, wherein determining whether a change in coverage area is warranted, comprises comparing a loading of an access point to a threshold loading level for that access point.

32. The non-transitory computer readable medium of claim 30, wherein determining whether a change in coverage area is warranted comprises comparing a loading of an access point to a loading of another access point.

33. The non-transitory computer readable medium of claim 24, wherein adjusting a beam pattern comprises steering the beam to arrive at a desired beam pattern.

34. The non-transitory computer readable medium of claim 24, wherein the monitoring and evaluating are performed at a scheduled time, periodically or on an event-driven basis.

35. The non-transitory computer readable medium of claim 24, wherein determining, evaluating and changing are performed iteratively.

36. A method of load balancing in a communication network, comprising:

determining and evaluating loading of a plurality of access points on the network;

performing load balancing on the network based on the determined and evaluated loading;

adjusting uplink attenuation in coordination with adjustments in transmit power with respect to signals sent by the registered wireless terminals to the access points provided in the network; and maintaining symmetry between uplink cell boundaries and downlink cell boundaries based on the adjusting, wherein the determining is made based on a number of wireless terminals registered to each of the plurality of access points and based on data throughput requirements for each of the registered wireless terminals or each of the plurality of access points, wherein the load balancing corresponds to either handing off a wireless terminal from one of the access points to another of the access points, or adjusting a cell coverage area of at least one of the access points.

37. The method of claim 36, wherein the determining is further made based on a class associated with each of the registered wireless terminals, wherein a particular class of registered wireless terminals is treated with a higher priority compared to other classes of registered wireless terminals.

38. The method of claim 36, wherein the determining is further made based on a type of data that is configured to be communicated by the registered wireless terminals.

39. The method of claim 36, further comprising:

examining traffic load that each of said access points is experiencing on an average and a peak basis, wherein the performing load balancing is based also on the examined traffic load.

40. The method of claim 36, further comprising:

receiving information regarding classes of devices and data, wherein the load balancing is performed based also on the classes of devices and data.

41. The method of claim 36, further comprising:

causing at least one wireless terminal to be handed off from one of the access points to another of the access points, based on the load balancing performed on the network, wherein the handing off is either a soft hand-off or a hard hand-off.

42. The method of claim 41, wherein the type of handing off as either soft hand-off or hard hand-off is determined based on separately evaluating loading on voice and data channels when performing the load balancing.

43. The method of claim 36, further comprising:

determining whether the load balancing would result in a network reconfiguration that would make the network closer to a baseline network configuration of cell coverage areas as compared to a current network configuration of cell coverage areas; and biasing in favor of a network reconfiguration if the network reconfiguration would make the network closer to the baseline network reconfiguration and biasing against the network reconfiguration otherwise.

44. The method of claim 36, wherein the determining is further made based on measuring, by respective non-serving access points of the registered wireless terminals, an uplink signal from the registered wireless terminals.

45. The method of claim 36, wherein the determining is further made based on ascertaining path losses for data communicated between the registered wireless terminals and the respective access points.

46. The method of claim 45, further comprising:
evaluating an uplink receive power and/or an uplink power headroom indicator received at the respective access points; and
determining whether cellular coverage areas of the respective access points need to be adjusted based at least on information obtained from said evaluating.

47. The method of claim 45, further comprising:
instructing, by a radio network controller, at least one of the wireless terminals to measure a downlink pilot signal strength output by access points other than the access point currently serving the at least one wireless terminal,
wherein the measured downlink pilot signal strength provides an estimate of path loss in a downlink direction; and
providing the measured downlink pilot signal strength from the at least one wireless terminal to the radio network controller.

48. The method of claim 36, wherein a serving cell of at least one of the registered wireless terminal is changed from a first access point to a second access point without changing the plurality of access points that the at least one of the registered wireless terminals is registered to, and
wherein data load on the first access point is decreased as a result while the at least one the registered wireless terminals remains in soft handoff with the plurality of access points.

49. A load balancing system in a communication network, comprising:
means for determining and evaluating loading of a plurality of access points on the network;
means for performing load balancing on the network based on the determined and evaluated loading;
means for adjusting uplink attenuation in coordination with adjustments in transmit power with respect to signals sent by the registered wireless terminals to the access points provided in the network; and
means for maintaining symmetry between uplink cell boundaries and downlink cell boundaries based on the adjusting,
wherein the loading is determined is made based on a number of wireless terminals registered to each of the plurality of access points and based on data throughput requirements for each of the registered wireless terminals or each of the plurality of access points.

50. The system of claim 49, wherein the determining is further made based on a class associated with each of the registered wireless terminals, wherein a particular class of registered wireless terminals is treated with a higher priority compared to other classes of registered wireless terminals.

51. The system of claim 49, wherein the determining is further made based on a type of data that is configured to be communicated by the registered wireless terminals.

52. The system of claim 49, further comprising:
means for examining traffic load that each of said access points is experiencing on an average and a peak basis,
wherein the performing load balancing is based also on the examined traffic load.

53. The system of claim 49, further comprising:
means for receiving information regarding classes of devices and data,
wherein the load balancing is performed based also on the classes of devices and data.

54. The system of claim 49, further comprising:
means for causing at least one wireless terminal to be handed off from one of the access points to another of the access points, based on the load balancing performed on the network,
wherein the handing off is either a soft hand-off or a hard hand-off.

55. The system of claim 54, wherein the type of handing off as either soft hand-off or hard hand-off is determined based on separately evaluating loading on voice and data channels when performing the load balancing.

56. The system of claim 45, further comprising:
means for determining whether the load balancing would result in a network reconfiguration that would make the network closer to a baseline network configuration of cell coverage areas as compared to a current network configuration of cell coverage areas; and
means for biasing in favor of a network reconfiguration if the network reconfiguration would make the network closer to the baseline network reconfiguration and biasing against the network reconfiguration otherwise.

* * * * *